(12) United States Patent
Shimizu et al.

(10) Patent No.: US 10,257,373 B2
(45) Date of Patent: Apr. 9, 2019

(54) NON-TRANSITORY COMPUTER-READABLE RECORDING MEDIUM AND CONFERENCE SYSTEM

(71) Applicant: KONICA MINOLTA, INC., Chiyoda-ku, Tokyo (JP)

(72) Inventors: Hideaki Shimizu, Hino (JP); Tohru Fujiwara, Yokohama (JP); Kazuhisa Kishimoto, Mitaka (JP); Katsutoshi Sawada, Hino (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 15/480,991

(22) Filed: Apr. 6, 2017

(65) Prior Publication Data

US 2017/0318167 A1 Nov. 2, 2017

(30) Foreign Application Priority Data

Apr. 28, 2016 (JP) .................................. 2016-091664

(51) Int. Cl.
*H04N 1/00* (2006.01)
*G06F 3/12* (2006.01)
*G06K 15/02* (2006.01)

(52) U.S. Cl.
CPC ....... *H04N 1/00411* (2013.01); *G06F 3/1203* (2013.01); *G06F 3/1204* (2013.01); *G06F 3/1226* (2013.01); *G06F 3/1268* (2013.01); *G06F 3/1286* (2013.01); *G06K 15/02* (2013.01); *H04N 2201/0094* (2013.01)

(58) Field of Classification Search
USPC ........................................................ 358/1.15
See application file for complete search history.

(56) References Cited

U.S. PATENT DOCUMENTS

| | | | |
|---|---|---|---|
| 2009/0067000 A1* | 3/2009 | Takiyama | G06Q 10/02 358/1.15 |
| 2009/0237326 A1* | 9/2009 | Takahashi | G06F 3/1423 345/2.1 |
| 2010/0049579 A1* | 2/2010 | Suzuki | G06Q 10/06311 705/7.19 |
| 2013/0159416 A1* | 6/2013 | Hirabayashi | H04L 65/403 709/204 |

FOREIGN PATENT DOCUMENTS

JP 2015-28703 A 2/2015

* cited by examiner

*Primary Examiner* — Ngon B Nguyen
(74) *Attorney, Agent, or Firm* — Buchanan Ingersoll & Rooney PC

(57) ABSTRACT

Disclosed is a non-transitory computer-readable recording medium in which a program is stored, wherein the program causes an information processing device to: obtain conference information of a conference; and prepare and display a print instruction window having a function for receiving a selection of a print apparatus used for a printing in a list of one or more print apparatuses by displaying the list and having a function for receiving an instruction for starting the printing, the print instruction window indicating the obtained conference information.

16 Claims, 25 Drawing Sheets

FIG.10

| PRINT APPARATUS | CONFERENCE ROOM |
|---|---|
| MFP1 | A、B |
| MFP2 | C、D |
| MFP3 | E、F、G、H |

CONFERENCE ROOM RELATED
INFORMATION REGISTRATION TABLE

| No | PARTICIPATION TIME | TITLE | CONTENTS |
|---|---|---|---|
| 1 | 2015/9/3 | DEVELOPMENT DISCUSSION 1 | DISCUSSION FOR DEVELOPMENT METHOD |
| 2 | 2015/10/6 | PAPER TECHNOLOGY | TECHNOLOGY FOR PAPER |
| 3 | 2016/2/10 | REFACTORING TECHNOLOGY | REFACTORING |

CONFERENCE PARTICIPATION HISTORY
OF ONE USER

FIG.23

| REGISTERED CONFERENCE INFORMATION 1 ||
|---|---|
| TIME OF CONFERENCE | 2016/XX/XX 10:00-11:00 |
| PLACE OF CONFERENCE | CONFERENCE ROOM A |
| PROMOTOR | TARO SATO |
| TITLE | LIFE-WORK BALANCE |
| CONTENTS | OPEN CONFERENCE FOR LIFE-WORK BALANCE |
| REGISTERED CONFERENCE INFORMATION 2 ||
| TIME OF CONFERENCE | 2016/XX/XX 10:00-12:00 |
| PLACE OF CONFERENCE | CONFERENCE ROOM D |
| PROMOTOR | JIRO SASAKI |
| TITLE | REFACTORING METHOD DISCUSSION |
| CONTENTS | OPEN CONFERENCE |

NON-TRANSITORY COMPUTER-READABLE RECORDING MEDIUM AND CONFERENCE SYSTEM

BACKGROUND OF THE INVENTION

Field of the Invention

The present invention relates to a non-transitory computer-readable recording medium and a conference system for relating the printing to the conference.

Description of Related Art

Various types of technologies for effectively printing a document used in the conference have been proposed. For example, in Japanese Patent Application Publication No. 2015-28703, the following technology is disclosed. In the technology, it is judged whether each participant of the conference can use his/her mobile phone or a projector is provided in the conference room in which the conference is held. Then, the number of the printed documents used in the conference is calculated in accordance with the result of the above judgment.

In detail, in the print window displayed after the conference is designated by the conference system, as the options for selecting the number of the printed documents used in the conference, the option (1) "the documents are printed for all of the participants in the conference, the option (2) "in case that a projector is provided in the conference room, the document is not printed, and the option (3) the document is not printed for the participant who has his/her mobile terminal which can be connected to the network, are displayed. Then, the necessary number of the printed documents is automatically calculated according to the option selected from these options by a user.

The conference includes the closed type of conference for only the participants who are previously designated and the open type of conference in which anyone can participate. In case of the open type of conference, anyone can participate. However, in case that everyone is not informed of the guidance information indicating the contents and the place of the conference, it cannot be known to everyone where the conference is held or what conference is held. Therefore, the members who actually participate are limited.

As an informing method which can be adopted by a promoter who wants to make many people participate in the conference in order to activate the conference, for example, the method for displaying the conference information on a web page, a scheduler or the like, has been proposed. However, in order to inform many people of the conference information by using the above method, each person is required to voluntarily see the corresponding page or the corresponding window. It is not possible to inform a person who does not voluntarily see the corresponding page or the like, of the date and time of the conference. Alternatively, the guidance information of the conference can be forcedly displayed on the screen of the personal computer by using a tag, a pop-up window or the like. However, even though a person sees the guidance information, there is a low possibility that the person expressly participates in the conference in case that it is not necessary that the person goes to the conference room.

SUMMARY

To achieve at least one of the abovementioned objects, a non-transitory computer-readable recording medium in which a program is stored, wherein the program causes an information processing device to:

obtain conference information of a conference; and prepare and display a print instruction window having a function for receiving a selection of a print apparatus used for a printing in a list of one or more print apparatuses by displaying the list and having a function for receiving an instruction for starting the printing, the print instruction window indicating the obtained conference information.

Preferably, when an application program receives a print instruction for printing an opened document from a user, the print instruction window is prepared and displayed.

Preferably, the program causes the information processing device further to obtain conference room related information for relating each print apparatus to one or more conference rooms, wherein the obtained conference information is displayed in the print instruction window so as to relate the obtained conference information to the print apparatus related to the conference room in which the conference indicated in the obtained conference information is held, in accordance with the obtained conference room related information.

Preferably, when the selection of the print apparatus in the list is received from a user, the conference information of the conference which is held in the conference room related to the selected print apparatus is displayed so as to be related to the selected print apparatus.

Preferably, when the print instruction window is prepared and displayed, the conference room in which the conference is currently held is specified and only the print apparatus related to the specified conference room is displayed in the list.

Preferably, the conference room in which the conference is currently held is specified in accordance with a usage condition of a projector provided in the conference room.

Preferably, the program causes the information processing device further to identify a user of the information processing device and to obtain an attribute of the user, wherein a correlation between the conference indicated in the conference information and the user of the information processing device is judged in accordance with contents of the conference indicated in the conference information and the obtained attribute of the user, and the print apparatus related to the conference room in which the conference having a high correlation with the user of the information processing device is held is preferentially displayed in the list.

Preferably, in the print instruction window, a print reservation button for reserving an execution of the printing so as to start the printing at a time corresponding to an opening time of the conference indicated in the conference information, is displayed with the conference information.

BRIEF DESCRIPTION OF THE DRAWINGS

The present invention will become more fully understood from the detailed description given hereinafter and the accompanying drawings given by way of illustration only, and thus are not intended as a definition of the limits of the present invention, and wherein:

FIG. 10 is a view showing an example of the conference room related information registration table;

FIG. 22 is a view showing an example of the conference participation history registration table;

FIG. 23 is a view showing the conference information of the conferences which are currently held or will be held and which are registered in the conference management server;

DETAILED DESCRIPTION OF PREFERRED EMBODIMENTS

Hereinafter, preferred embodiments of the present invention will be explained with reference to the accompanying drawings.

First Embodiment

Figure 1:
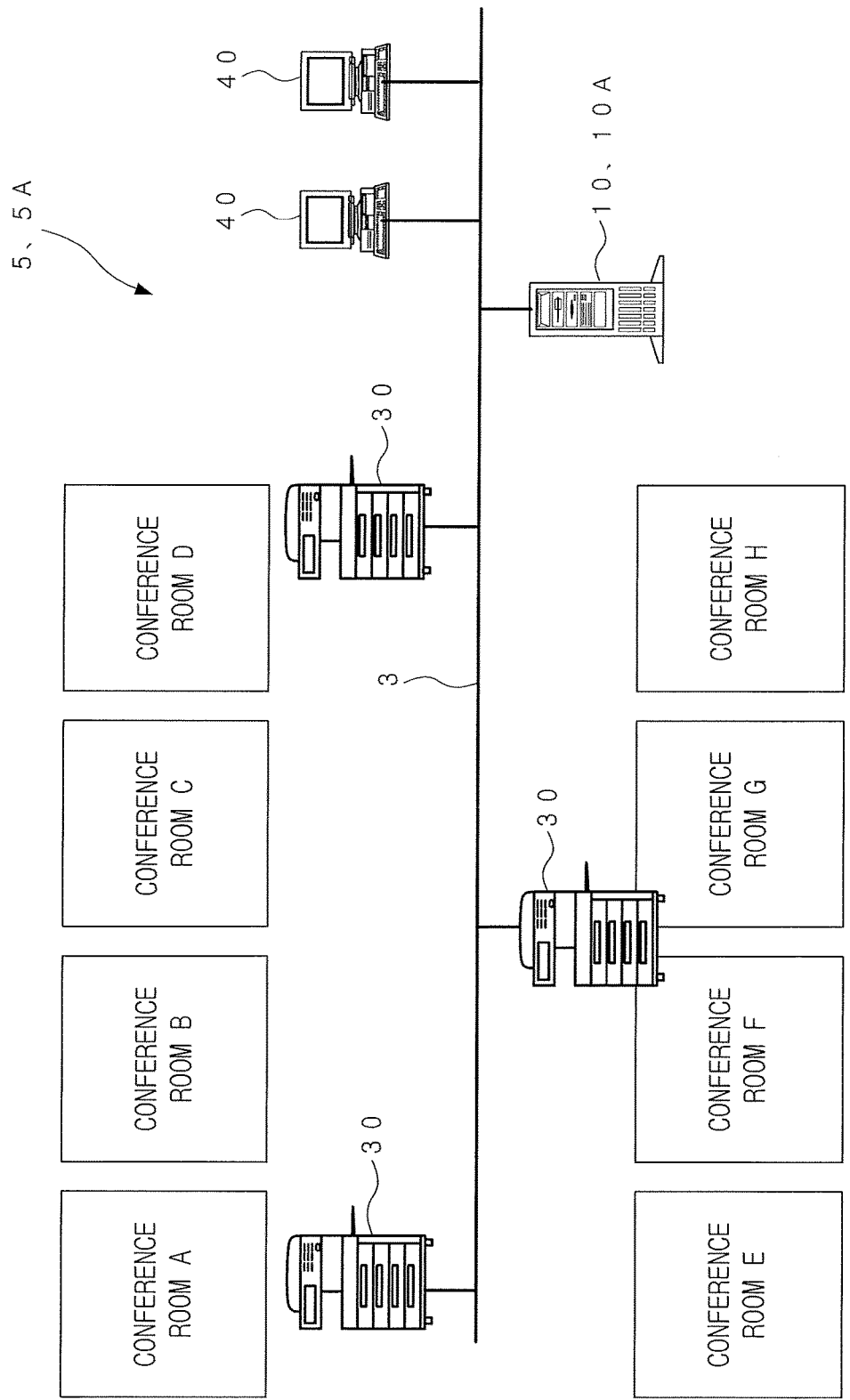
FIG. 1 is a view showing an example of the configuration of the conference system according to the first embodiment and an example of the operating environment thereof.

FIG. 1 is a view showing an example of the configuration of the conference system 5 according to the first embodiment and an example of the operating environment thereof. The conference system 5, 5A comprises a conference management server 10, 10A, a plurality of print apparatuses 30 and a plurality of information processing terminals 40, such as a personal computer, a mobile terminal and the like, which are used by each user, so as to be connected with each other via a network 3, such as a LAN (Local Area Network) or the like. In case that the conference management server and the like disclosed in each of the first to the sixth embodiments are separately explained, the reference numeral to which the alphabetical mark, such as A, B or the like, is attached, is used. In case that the conference management servers and the like disclosed in the first to the sixth embodiments are comprehensively explained, the reference numeral to which the alphabetical mark is not attached, is used.

The information processing terminal 40 transmits a print job to one of the print apparatuses 30 via the network 3. The conference management server 10 registers and manages the conference information of the conference. For example, the information including the date and time, the place, the promoter, the title, the contents and the like of the conference, is registered and managed as the conference information in the database 17 (See FIG. 2). A user can access to the conference management server 10 by using a browser, and can register the conference information and view the registered conference information via a web interface.

In each embodiment, as each place of the conferences managed by the conference management server 10, there are eight conference rooms A to H. Further, three print apparatuses 30 are provided. Each print apparatus 30 is provided near one or more conference rooms selected from the conference rooms A to H.

Figure 2:
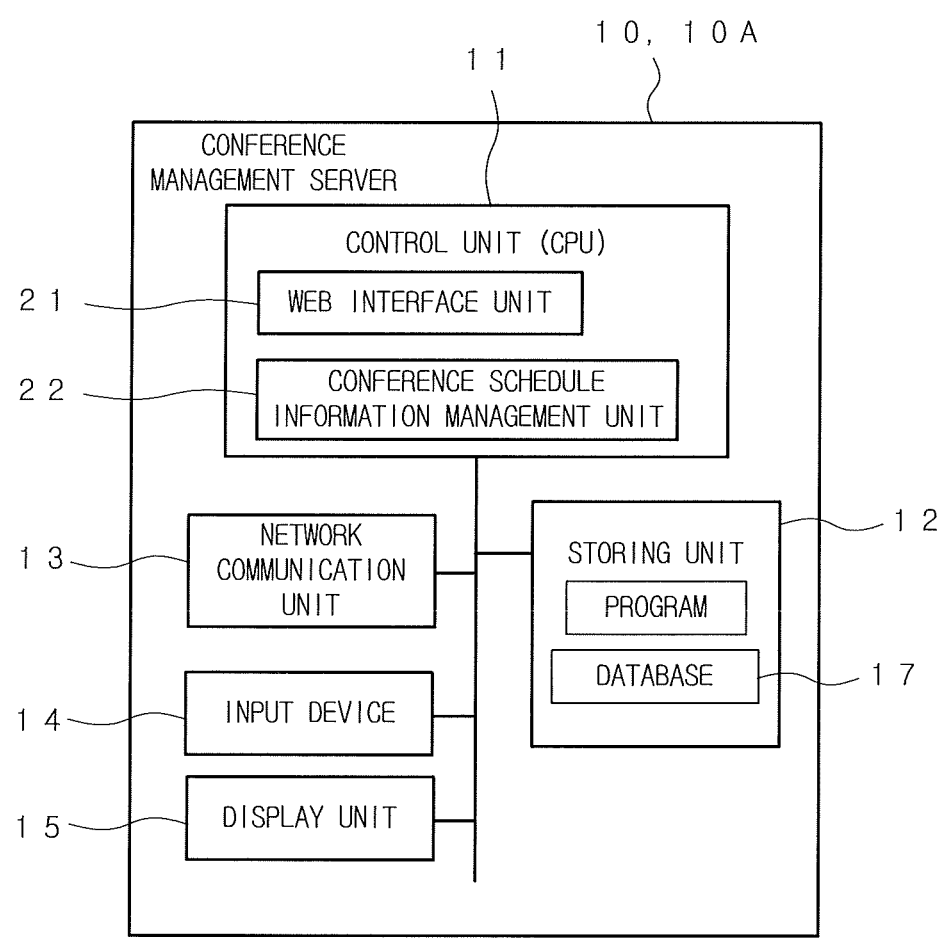
FIG. 2 is a block diagram showing the configuration of the conference management server according to the first embodiment.

FIG. 2 is a block diagram showing the schematic configuration of the conference management server 10A according to the first embodiment. The conference management server 10A is a computer having the server function. The conference management server 10A comprises a control unit 11 including a CPU (Central Processing Unit) as a main unit, a storing unit 12 including a RAM (Random Access Memory), a ROM (Read Only Memory), a nonvolatile memory, a hard disk drive and the like, a network communication unit 13 for communicating with an external device, such as the print apparatus 30, the information processing terminal 40 and the like, via the network 3, an input device 14 including a keyboard, a mouse, a touch panel and the like, and a display unit 15 including a liquid crystal display or the like.

In the storing unit 12, the programs executed by the control unit 11, the above-described database 17 and the like are stored.

The control unit 11 executes various types of processes in accordance with the programs stored in the storing unit 12. The control unit 11 has the function as the web interface unit 21, the conference schedule information management unit 22 and the like by executing the programs stored in the storing unit 12.

The web interface unit 21 has the function for preparing and transmitting the web page for registering the conference information in the database 17 by a user and viewing the registered conference information, and the function for instructing the user's information processing terminal 40 and the like to display the web page via the network.

The conference schedule information management unit 22 has the function for registering the information relating to the conference, which is received via the above web page, in the database 17, and for reading out the conference information from the database 17 according to the request from the information processing apparatus 40 to transmit the above conference information to the information processing apparatus 40 which transmits the above request.

Figure 3:
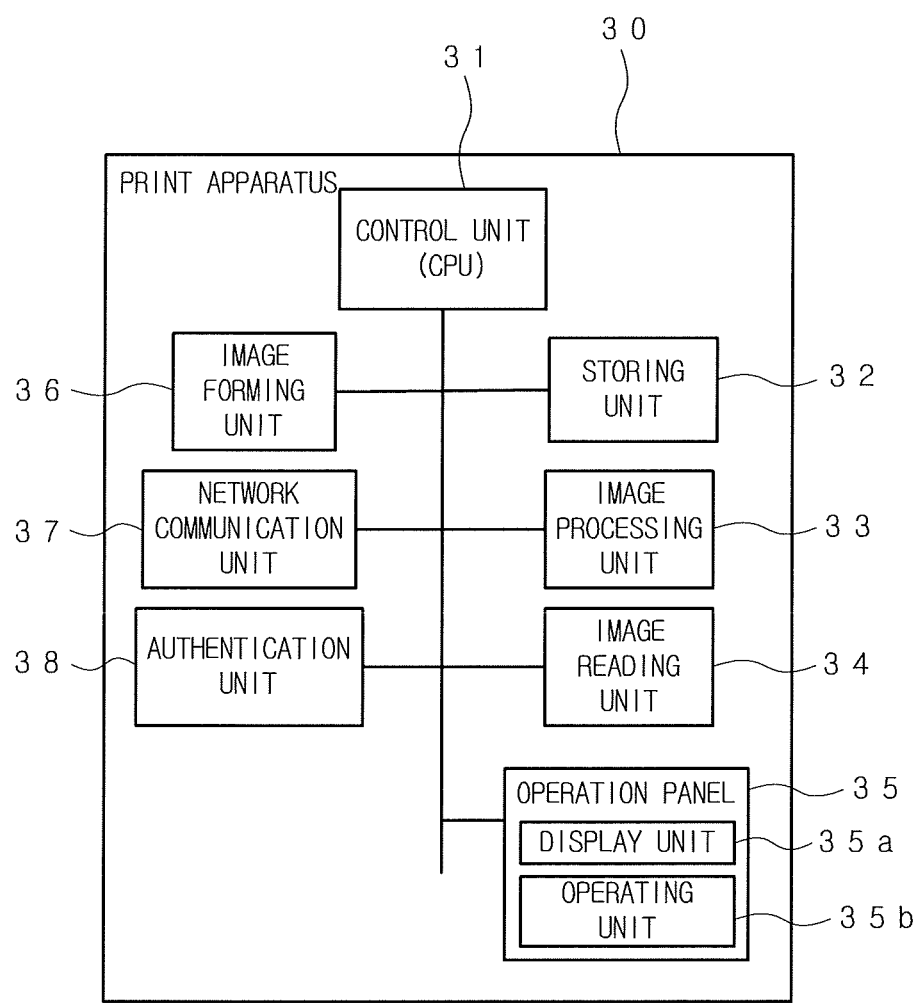
FIG. 3 is a block diagram showing the schematic configuration of the print apparatus according to each embodiment.

FIG. 3 is a block diagram showing the schematic configuration of the print apparatus 30. The print apparatus 30 is so-called multi function peripheral which has the copy function for printing an image of an original on a recording sheet by optically reading the original, the scan function for storing the image data of the read original as a file and transmitting the image data to an external terminal via the network 3, the print function for printing out a document or an image on a recording sheet in accordance with the print job received from the information processing apparatus 40 via the network 3, and the like. Hereinafter, the print apparatus 30 is also referred to as MFP.

The print apparatus 30 comprises a control unit 31 for entirely controlling the operation of the print apparatus 30. The control unit 31 comprises a CPU and the like as the main unit. The control unit 31 is connected with a storing unit 32, an image processing unit 33, an image reading unit 34, an operation panel 35, an image forming unit 36, a network communication unit 37, an authentication unit 38 and the like.

The storing unit 32 comprises a ROM, a RAM, a hard disk drive, a nonvolatile memory and the like. In the storing unit 32, various types of programs and data are stored. By executing various processes in accordance with these programs by the control unit 31, each function of the print apparatus 30 is realized.

The image processing unit 33 carries out the compression/decompression process for the image data, and the like in addition to the processings, such as the enlargement/reduction or the rotation of image data.

The image reading unit (the reading device) 34 has the function for obtaining the image data by optically reading the original.

The operation panel 35 comprises a display unit 35a and an operating unit 35b. The display unit 35a comprises a liquid crystal display or the like, and has the function for displaying various types of operating windows, setting windows and the like. The operating unit 35b comprises various types of operation switches, such as a start button and the like, a touch panel provided on the display screen of the display unit 35a, and the like. The touch panel detects the coordinate position on which the display screen of the display unit 35a is pressed down by a touch pen, the user's finger or the like.

The image forming unit 36 has the function for forming an image on the recording sheet in accordance with the image data. In this embodiment, the image forming unit 36 is configured as a so-called laser printer which comprises a conveying device for the recording sheet, a photoconductive drum, a charging device, a laser unit, a developing device, a transfer and separation device, a cleaning device and a fixing device, and which forms an image by the electrophotographic process. Alternatively, an image may be formed by another type of printer.

The network communication unit 37 has the function for communicating with the information processing terminal 40, the conference management server 10, other external devices and the like via the network 3.

The authentication unit 38 has the function for carrying out the user authentication. For example, the authentication unit 38 is an IC card reader for reading an IC card in which the user authentication information is registered, or the like. The authentication unit 38 may be a vein scanning device for carrying out the user authentication by the vein authentication. Alternatively, the authentication unit 38 may be a unit for carrying out the user authentication by entering the user ID and the password via the operation panel 35 to log in the print apparatus 30.

Figure 4:
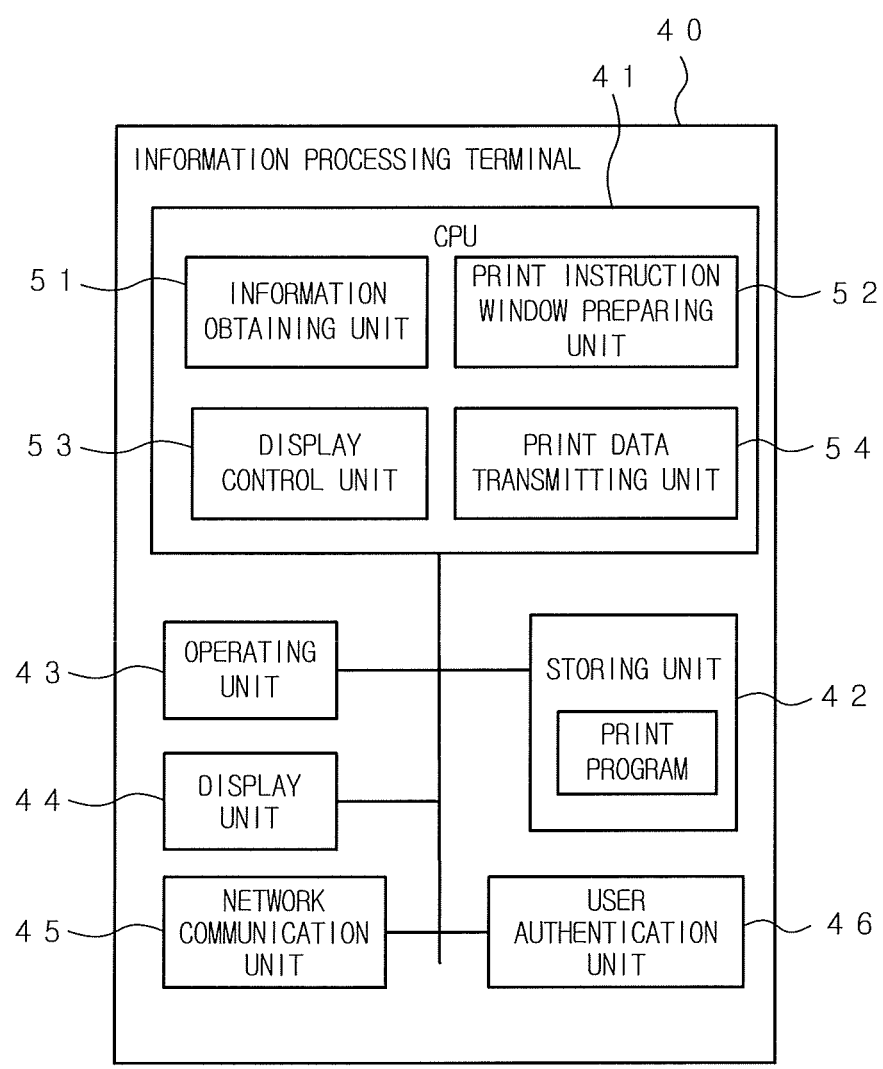
FIG. 4 is a block diagram showing the schematic configuration of the information processing terminal according to each embodiment.

FIG. 4 is a block diagram showing an example of the schematic configuration of the information processing terminal 40. The information processing terminal 40 comprises a CPU 41 for entirely controlling the operation of the information processing terminal 40. The CPU 41 is connected with a storing unit 42, an operating unit 43, a display unit 44, a network communication unit 45, a user authentication unit 46 and the like via a bus.

By the CPU 41, a middleware, application programs and the like are executed on an OS (Operating System) program as a base. The ROM 42 comprises a ROM, a RAM, a nonvolatile memory and the like. In the ROM 42, the print program, the OS program, each printer driver, various types of programs and data are stored. By executing various types of processes by the CPU 41 in accordance with these programs, each function of the information processing terminal 40 is realized.

The display unit 43 comprises a liquid crystal display or the like, and has the function for displaying various types of operating windows, setting windows and the like. The operating unit 44 comprises some hardware keys, a touch panel provided on the physical screen of the display unit 43, and the like.

The network communication unit 45 has the function for communicating with the conference management server 10, the print apparatus 30, other external devices and the like via the network.

The user authentication unit 46 has the function for authenticating a user (logged-in user) of the information processing terminal 40 like the authentication unit 38 of the print apparatus 30.

The CPU 41 has the function as the information obtaining unit 51, the print instruction window preparing unit 52, the display control unit 53, the print data transmitting unit 54 and the like by executing the programs stored in the storing unit 42.

The information obtaining unit 51 obtains various types of information, such as the conference information and the like, from the conference management server 10. The print instruction window preparing unit 52 prepares the customized print instruction window which will be explained later. The display control unit 53 controls the display unit 44 so as to display various types of windows, such as the customized print instruction window and the like. The print data transmitting unit 54 controls the network communication unit 45 so as to transmit the print job to the print apparatus 30 or the conference management server 10 via the network communication unit 45.

Figure 5:
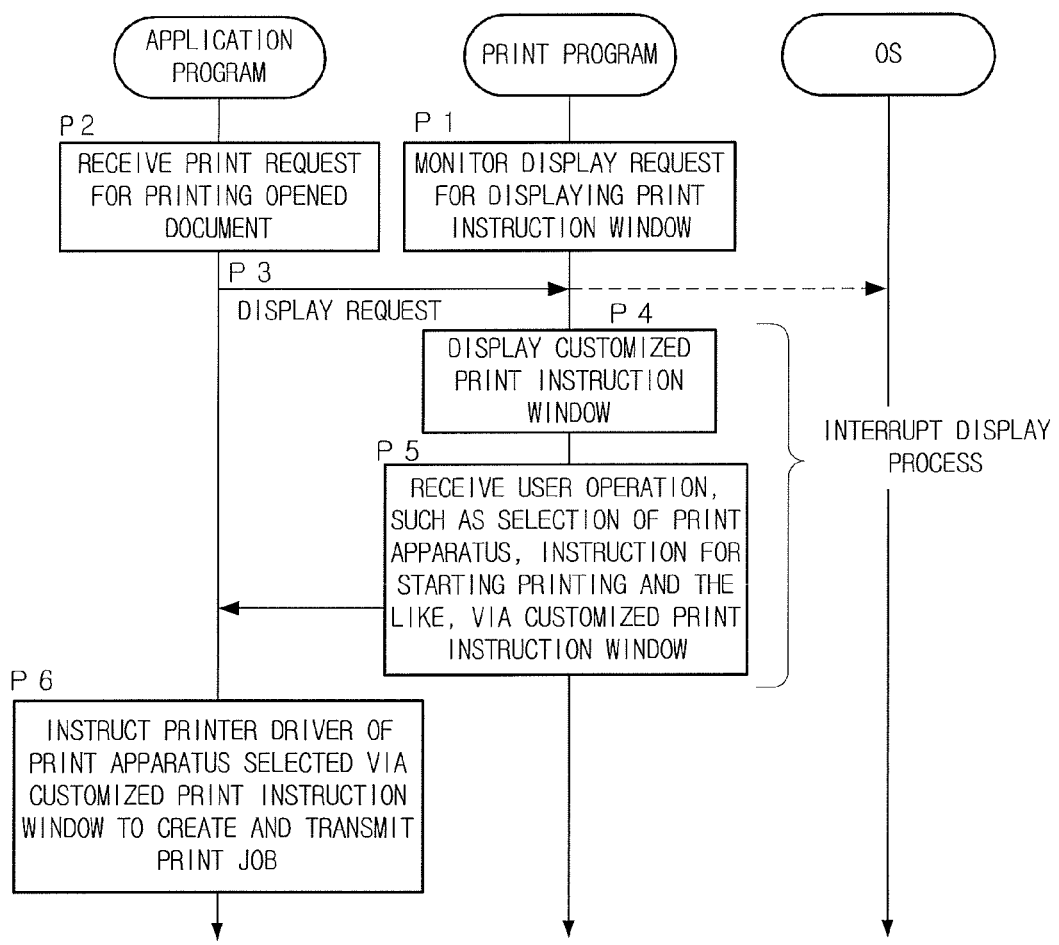
FIG. 5 is a view showing the summary of the operation of the print program installed in the information processing terminal according to the first embodiment and the operations of the programs installed in the peripheral apparatuses.

FIG. 5 shows the summary of the operation of the print program installed in the information processing terminal 40 according to the first embodiment. In general, an application program, such as a document preparation program, a drawing preparation program and the like, has the function for printing an opened document. When the option "print" is selected from the file menu or the like, the print instruction window (the print dialog) which is a window for selecting the print apparatus to be instructed to execute the printing and for instructing the selected print apparatus to execute the printing, is displayed.

The print instruction window displays the list of the print apparatuses available for the printing (printer list), and receives the selection of the print apparatus to be instructed to execute the printing, from a user. When the instruction for starting the printing is received from the user by pressing down the print button, the print program creates the print job for printing the opened document and transmits the created print job to the selected print apparatus.

In general, the display of the print instruction window is one function of the OS. When the option "print" is selected from the file menu and the application program requests the OS to display the print instruction window (the function call is executed for the specific function of the OS), the print instruction window is displayed. The print instruction window can be customized by the third application program which is separated from the OS. As described above, the print instruction window is a common window for various types of application programs which are operated on the OS. Therefore, by customizing the print instruction window on the OS level, the print instruction window which is originally customized can be set to a print instruction window which is displayed when each of the application programs requests the information processing apparatus 40 to display the print instruction window. The print program according to each of the embodiments is a program for displaying the print instruction window which is originally customized.

The print program according to the embodiment is the resident software. As shown in FIG. 5, the print program monitors whether the application program, such as the document preparation application or the like, outputs the display request for displaying the print instruction window to the OS (P1). When the application program receives the print request for printing a document from a user via the filing menu or the like (P2) and outputs the display request for displaying the print instruction window to the OS (P3), the print program interrupts the display process executed by the OS in accordance with the display request. Then, instead of the standard print instruction window of the OS, the print program displays the print instruction window which is originally customized (hereinafter, referred to as the customized print instruction window) on the display unit 44 (P4).

When the selection of the print apparatus and the instruction for starting the printing are received from the user via the customized print instruction window (P5), the print program closes the customized print instruction window and returns the operation contents received via the customized print instruction window to the application program. The application program which receives the operation contents, instructs the printer driver of the print apparatus selected via the customized print instruction window to create and transmit the print job for printing the opened document (P6).

Figure 6:
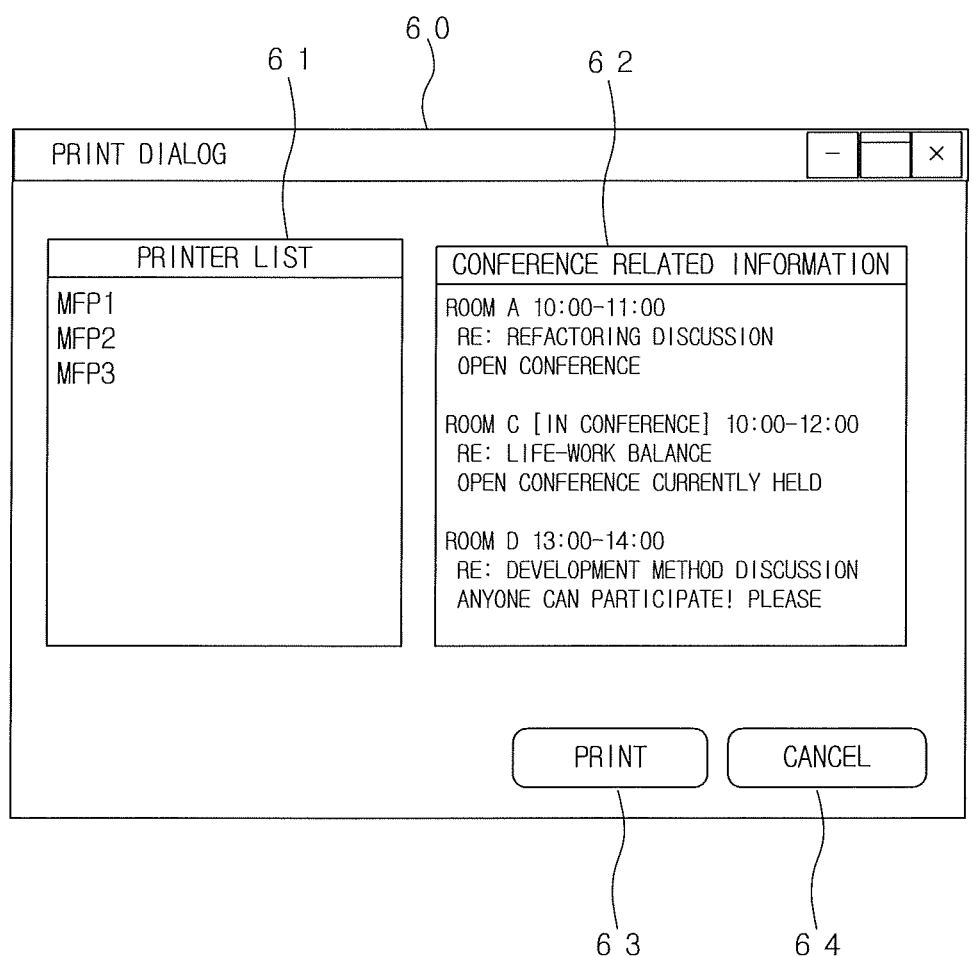
FIG. 6 is a view showing an example of the customized print instruction window which is displayed on the information processing terminal of the conference system according to the first embodiment.

FIG. 6 shows an example of the customized print instruction window 60 displayed by the information processing terminal 40 of the conference system 5A according to the first embodiment. The customized print instruction window 60 displays the printer list 61 which is a list of the selectable print apparatuses, and the conference schedule information 62 in accordance with the conference information obtained from the conference management server 10. A user can select the print apparatus 30 to be instructed to execute the printing, from the print apparatuses 30 (MFPs 1 to 3) displayed in the printer list 61. The print button 63 arranged in the lower part of the window is an operation button for instructing the starting of the printing and for closing the window. The cancel button 64 is an operation button for cancelling the setting in the window and for closing the window.

Figure 7:
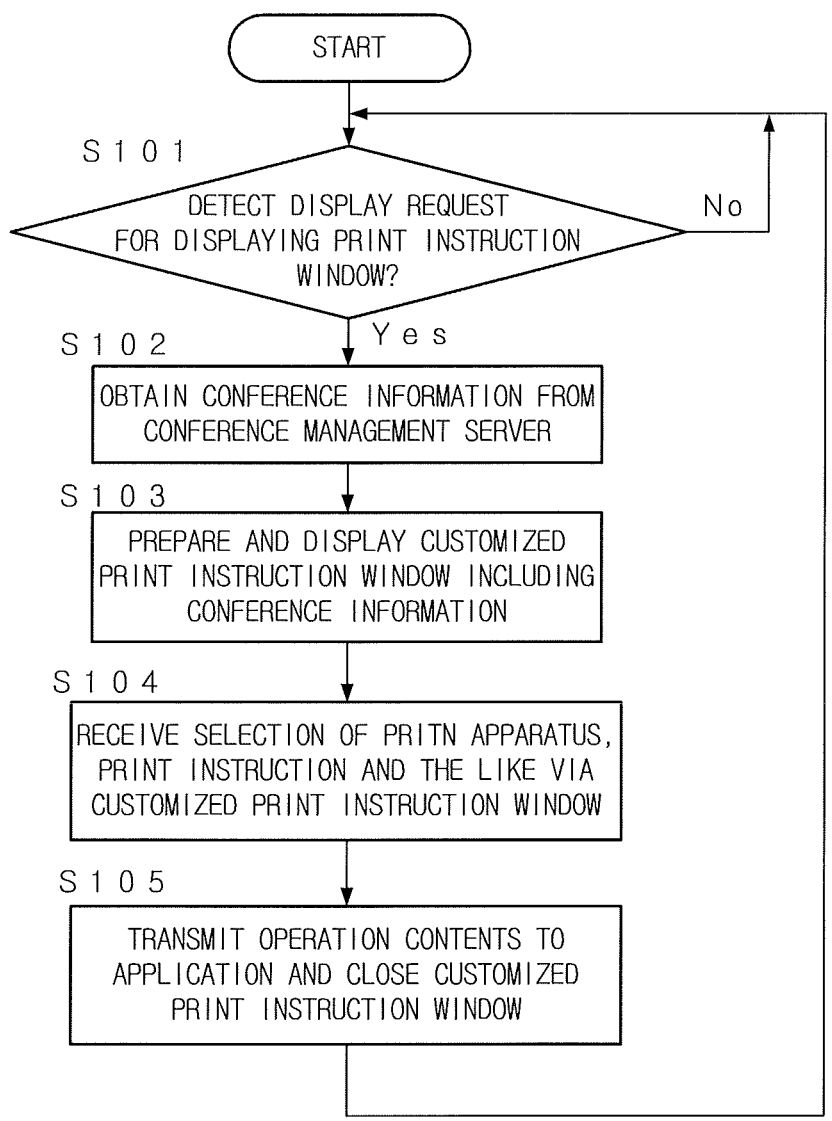
FIG. 7 is a flowchart showing the process which is executed by the print program installed in the information processing terminal of the conference system according to the first embodiment.

FIG. 7 is a flowchart showing the process which is executed by the print program installed in the information processing terminal 40 of the conference system 5A according to the first embodiment. The print program always monitors whether the application program, such as the document preparation program or the like, outputs the display request for displaying the print instruction window (Step S101). When the print program detects the above display request (Step S101; Yes), the print program accesses to the conference management server 10A to obtain the conference information (Step S102).

Then, the print program prepares the customized print information window 60 displaying the printer list 61 and the conference schedule information 62 in accordance with the conference information obtained from the conference management server 10A, and displays the prepared customized print information window 60 on the display unit 44 of the information processing terminal 40 (Step S103). Further, the print program receives the selection of the print apparatus 30, the instruction for starting the printing and the like from the user (Step S104). In this embodiment, the conference information of the conference which has been already started or which will be started within the predetermined time (for example, today, within a few hours or the like) is shown. Alternatively, the conference information of all of the conferences obtained from the conference management server 10 may be shown.

When the operation for the print button 63 or the cancel button 64 is received, the print program transmits the operation contents to the application and closes the customized print instruction window 60 (Step S105). Then, the process returns to Step S101.

In the conference system 5A and the print program for this system according to the first embodiment, when the application program, such as the document preparation program or the like, receives the print request from a user, instead of the standard print instruction window of the OS, the customized print instruction window 60 including the conference information obtained from the conference management server 10A is displayed. Therefore, it is possible to inform the user of the information relating to the conference when the user uses one of the print apparatuses 30 to execute the printing.

That is, the user who instructs the print apparatus to execute the printing, stands up and moves to the print apparatus 30 to take the printed document. In case that the conference information is provided in the customized print instruction window 60, it is possible to motivate the user who is informed of and is interested in the open type of conference to participate in the conference when the user takes the printed document.

Second Embodiment

In the second embodiment, the conference information is provided in consideration of the distance between the print apparatus 30 and the conference room. The explanation of the same part as the first embodiment is omitted accordingly.

Figure 8:
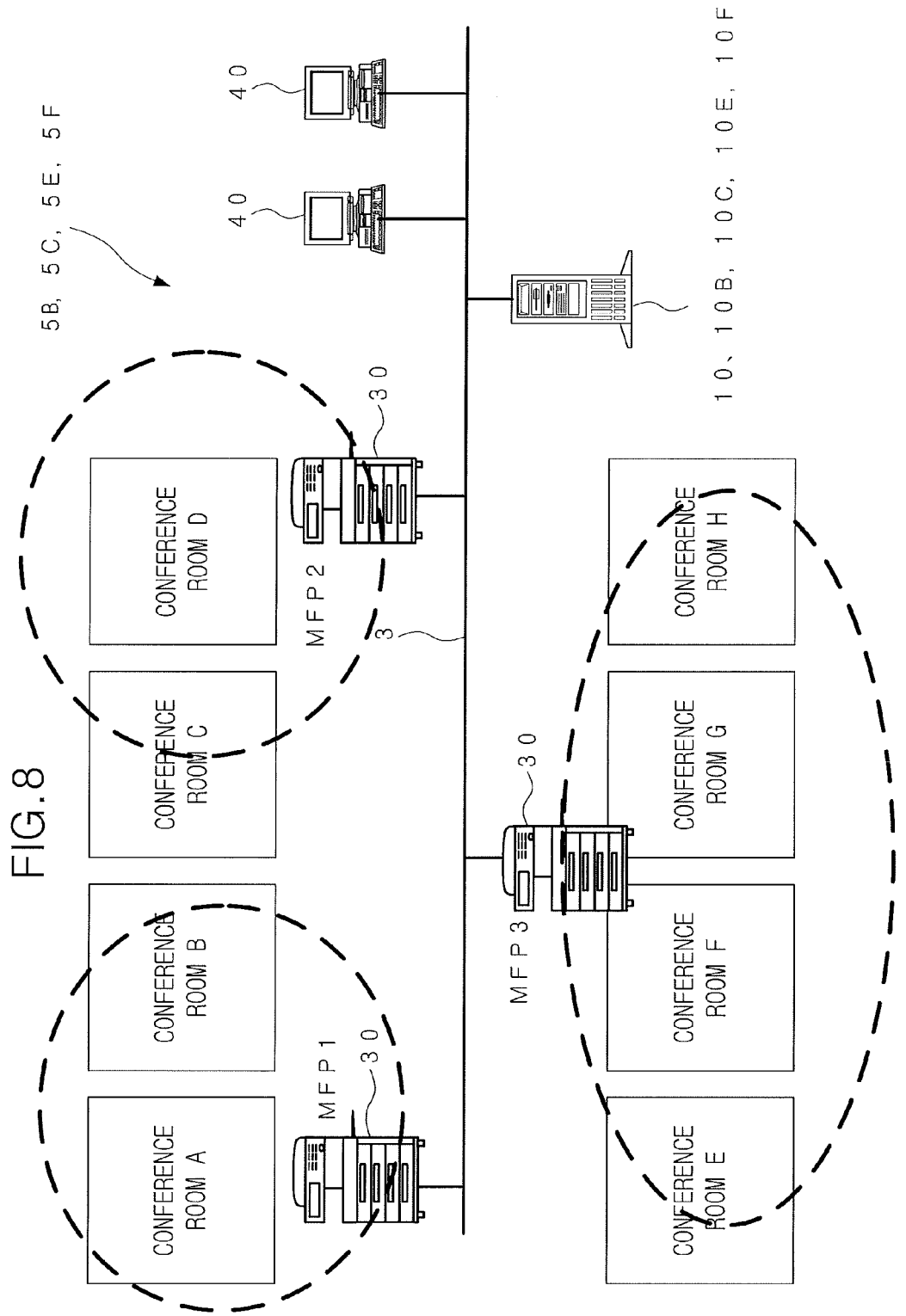
FIG. 8 is a view showing an example of the configuration of the conference system according to the second embodiment and an example of the operating environment thereof.

FIG. 8 shows the conference system 5B according to the second embodiment. In the conference system 5B, the print apparatuses (MFPs) 30 and the conference rooms are managed by previously relating one print apparatus 30 to one or more conference rooms which the above one print apparatus 30 is provided near. In the example shown in FIG. 8, MFP1 is provided near the conference rooms A and B, MFP2 is provided near the conference rooms C and D, and MFP3 is provided near the conference rooms E to H.

Figure 9:
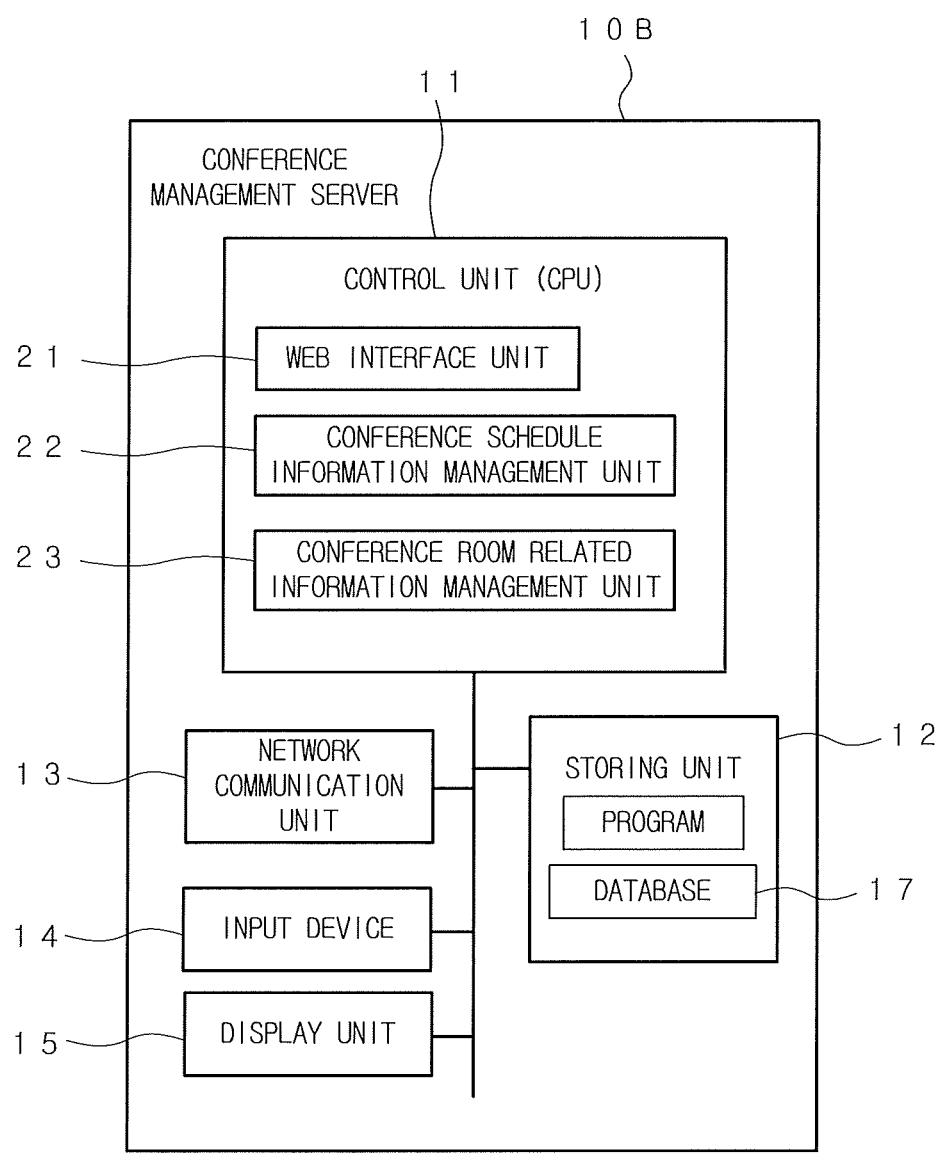
FIG. 9 is a block diagram showing the configuration of the conference management server used in the conference system according to the second embodiment.

FIG. 9 is a block diagram showing the configuration of the conference management server 10B used in the conference system 5B according to the second embodiment. As compared with the conference management server 10A shown in the first embodiment, in the conference management server 10B according to the second embodiment, the control unit 11 further has the function as the conference room related information management unit 23.

The conference room related information management unit 23 manages the correspondence relation between one print apparatus 30 and one or more conference rooms which the above one print apparatus 30 is provided near. In detail, the conference room related information registration table 70 is prepared as shown in FIG. 10 and is stored in the storing unit 12. According to the request from the information processing terminal 40, the conference room related information management unit 23 transmits the information registered in the conference room related information registration table 70 to the information processing terminal 40 which transmits the above request.

The conference room related information can be registered and changed in the conference room related information registration table 70 via the web interface displayed when the user accesses to the server management server 10 via a browser. However, the person who can access to the server management server 10 is restricted to the person who obtains the specific permission, such as the administrator or the like.

Figure 11:
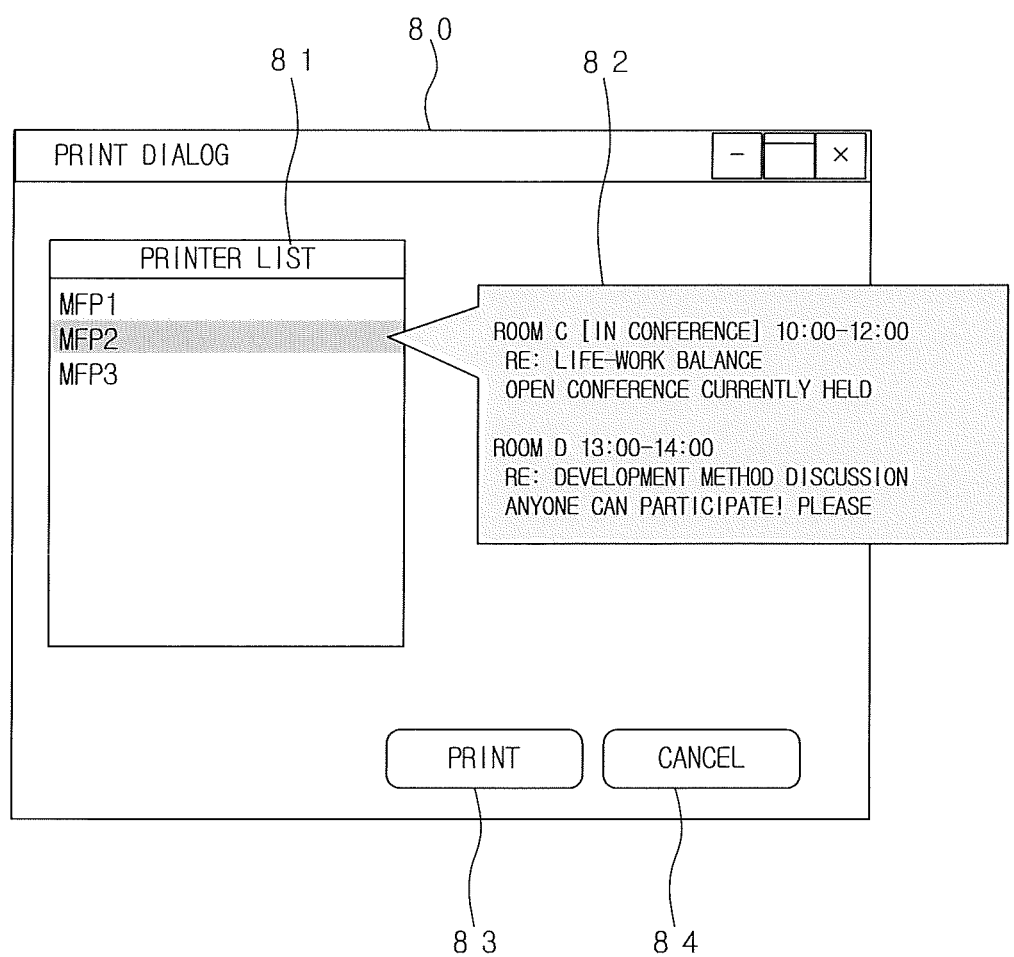
FIG. 11 is a view showing an example of the customized print instruction window which is displayed on the information processing terminal of the conference system according to the second embodiment.

FIG. 11 shows an example of the customized print instruction window 80 which is displayed on the information processing terminal 40 of the conference system 5B according to the second embodiment. In the customized print instruction window 80, the print list 81 which is a list of the selectable print apparatuses is shown. Further, when a user selects one print apparatus (MFP) 30 in the displayed printer list 81, the conference information of the conference held in the conference room which is related to the selected print apparatus (MFP) 30 is displayed in the conference information display window 82 which is a pop-up window.

For example, when a user selects MFP2 is the printer list 81, the conference information display window 82 is popped up as described above and the conference information of the conference which is held near the selected MFP2 is shown in the conference information display window 82. The print button 83 arranged in the lower part of the window is the same as the print button 63 of the customized print instruction window 60 shown in the first embodiment. The cancel button 84 is the same as the cancel button 64 shown in the first embodiment. Therefore, the explanation thereof is omitted.

Figure 12:
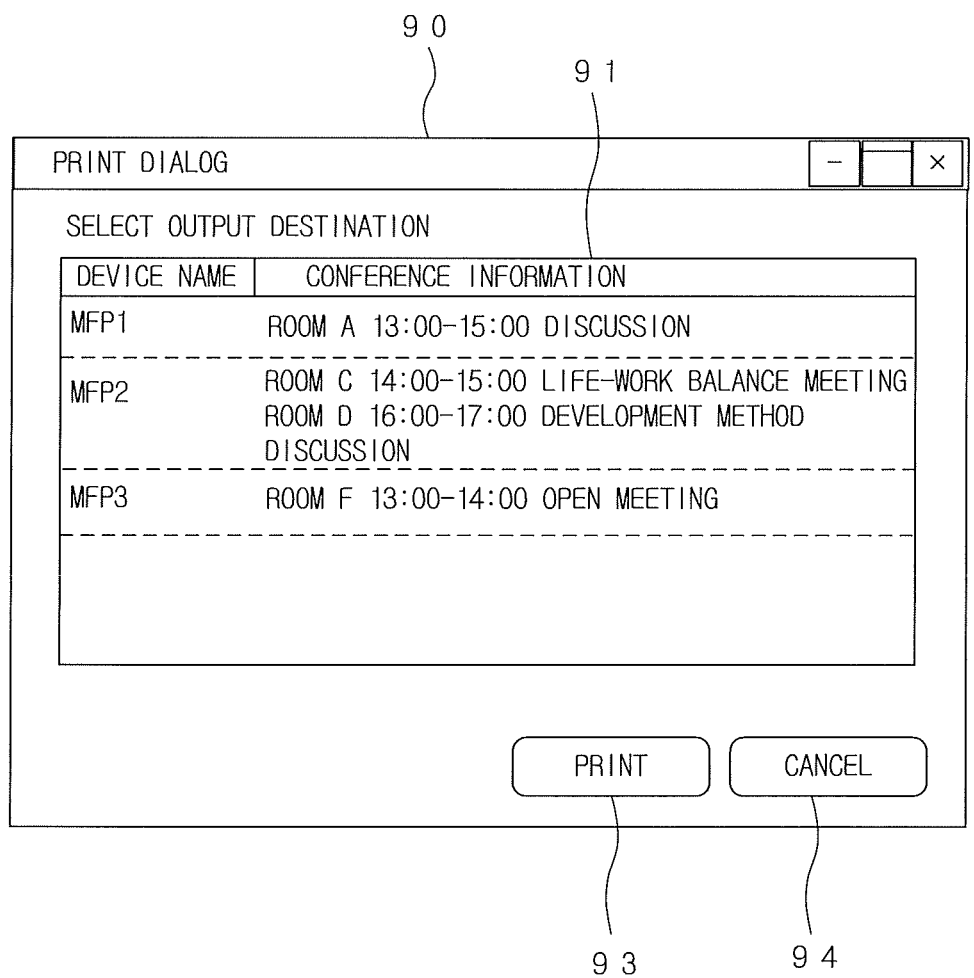
FIG. 12 is a view showing an example of another type of customized print instruction window which is displayed on the information processing terminal of the conference system according to the second embodiment.

FIG. 12 shows an example of another type of customized print instruction window 90. The customized print instruction window 90 displays the printer list 91 in which the print apparatuses are listed so as to be related to the conference information of the conference held in the conference room related to each print apparatus. The print button 93 arranged in the lower part of the window is the same as the print button 63 of the customized print instruction window 60 shown in the first embodiment. The cancel button 94 is the same as the cancel button 64 shown in the first embodiment. Therefore, the explanation thereof is omitted.

Figure 13:
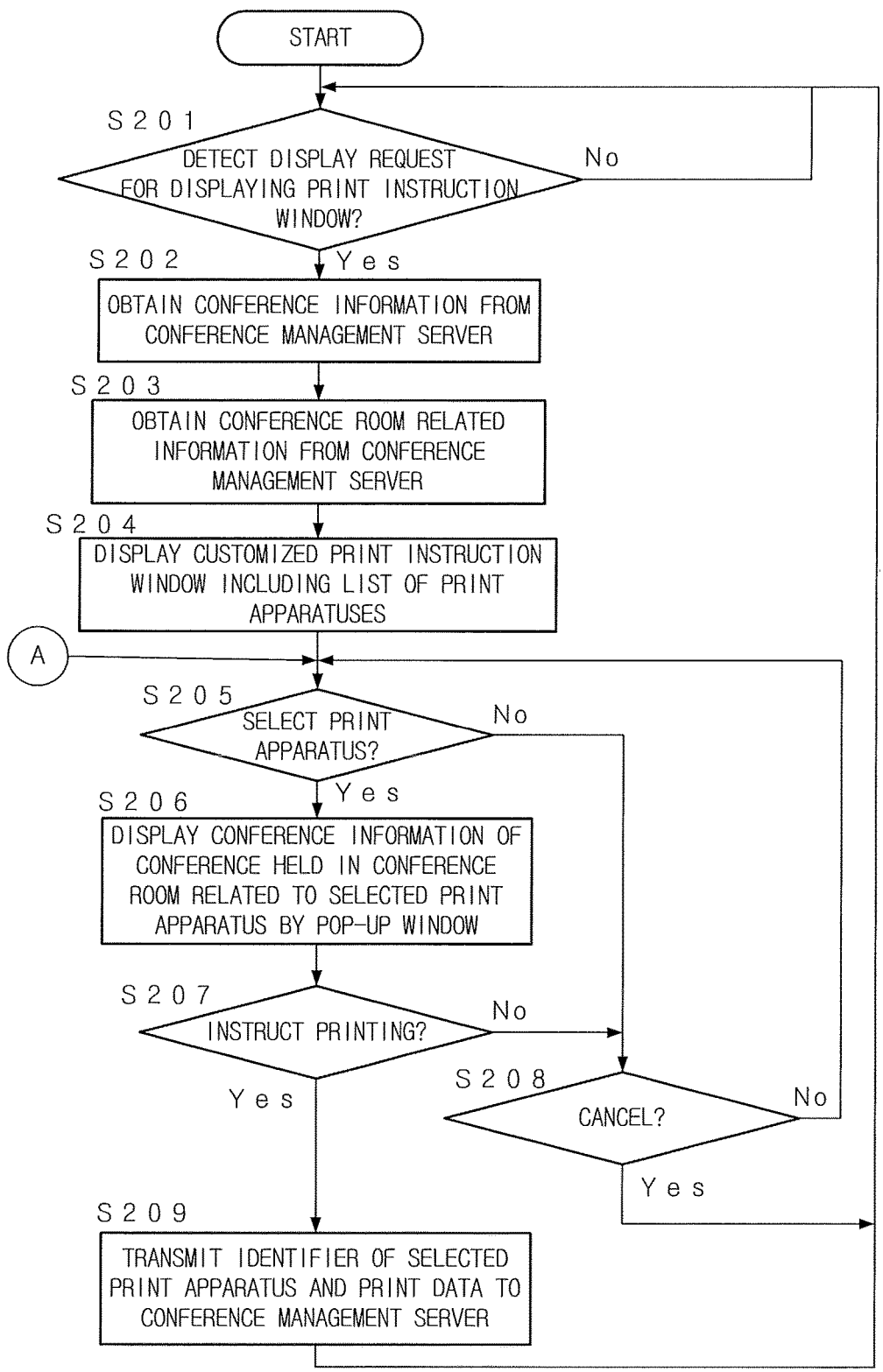
FIG. 13 is a flowchart showing the process which is executed by the print program installed in the information processing terminal of the conference system according to the second embodiment.

FIG. 13 is a flowchart showing the process which is executed by the print program installed in the information processing terminal 40 of the conference system 5B according to the second embodiment. FIG. 13 shows the process for displaying the customized print instruction window 80 shown in FIG. 12. In this example, it is possible to display the printer list 81 of the customized print instruction window 80 by obtaining the list of the print apparatuses 30 on the network 3 from the conference management server 10 even though the printer driver is not installed in the information processing terminal 40.

The print program monitors whether the application program, such as the document preparation program or the like, outputs the display request for displaying the print instruction window (Step S201; No). When the print program detects the above display request (Step S201; Yes), the print program accesses to the conference management server 10 to obtain the conference information (Step S202).

Further, the print program obtains the conference room related information (the information registered in the conference room related information registration table 70 shown in FIG. 10) from the conference management server 10 (Step S203). The information processing terminal 40 recognizes the print apparatuses 30 on the network 3 and the conference rooms related to each print apparatus 30 from the obtained conference room related information. Then, the information processing terminal 40 displays the customized print instruction window 80 in which the print apparatuses 30 on the network 3 are shown as the printer list 81, on the display unit 44 thereof (Step S204).

When one print apparatus 30 is selected in the printer list 81 (or the cursor is positioned on one print apparatus 30 by using a mouse or the like) (Step S205; Yes), the conference information of the conference held in the conference room related to the selected print apparatus 30 is displayed by popping up the conference information display window 82 (Step S206).

When the print instruction (the operation for the print button 83) is received in the situation in which one print apparatus 30 is selected (Step S207; Yes), the print program of the information processing terminal 40 transmits the identifier of the selected print apparatus 30 and the print data to the conference management server 10, and closes the customized print instruction window 80 (Step S209). Then, the process returns to Step S201.

The conference management server 10 which receives the identifier of the print apparatus 30 and the print data, transfers the received print data to the print apparatus 30 having the received identifier. The print apparatus 30 which receives the print data executes the printing in accordance with the received print data. In the printing, the lpr protocol may be used. Alternatively, the printer driver of each print apparatus 30 may be used. When the printer driver is used, each printer driver is previously installed in the conference management server 10.

Regardless of whether one print apparatus 30 is selected or not, in case that the operation for the cancel button 84 is received (Step S208; Yes), the customized print instruction window 80A is closed. Then, the process returns to Step S201 and is continued.

As described above, in the second embodiment, the print apparatus is displayed so as to be related to the conference information of the conference held in the conference room which the above print apparatus is provided near. For example, in case that a user selects the print apparatus 30 as the output destination, which is displayed so as to be related to the conference information of the interested conference, it is possible to participate in the interested conference when the user takes the printed document. Therefore, it is possible to motivate the user to participate in the conference by utilizing the timing at which the user takes the printed document.

The conference system 5B may be configured as follows by using the conference room related information. The customized print instruction window 60 shown in FIG. 6 according to the first embodiment is displayed. When the selection of the conference information is received in the display area of the conference schedule information 62, the print apparatus 30 which is provided near the conference room in which the conference indicated in the selected conference information is held, is highlighted or is automatically selected. In this case, a user can be informed of all of the conferences, and can easily select the print apparatus 30 which is provided near the place of the interested conference among all of the conferences.

Third Embodiment

In the conference system 5C (See FIG. 8) according to the third embodiment, the print apparatus 30 which no conference is held near, is not shown in the printer list of the customized print instruction window.

Figure 14:
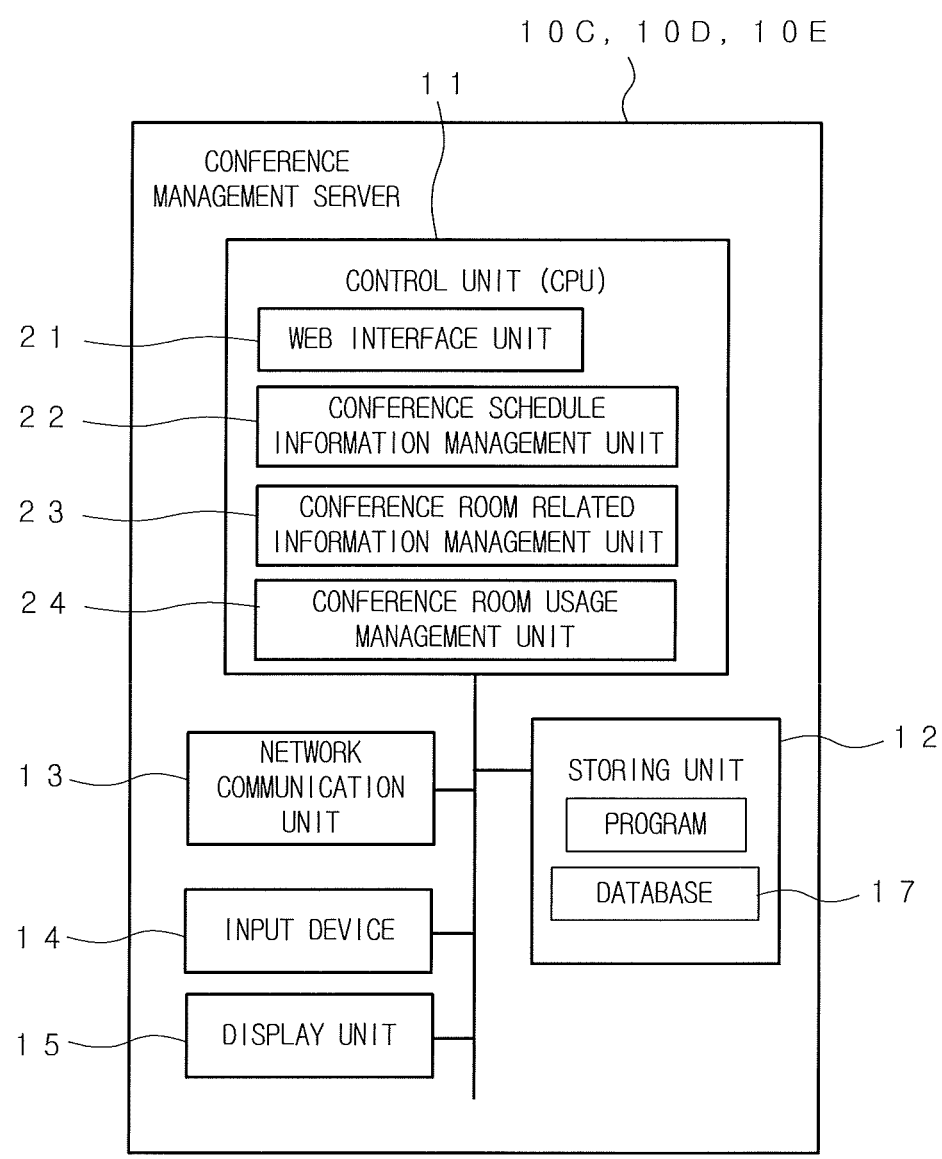
FIG. 14 is a block diagram showing the schematic configuration of the conference management server used in the conference system according to the third embodiment.

FIG. 14 is a block diagram showing the schematic configuration of the conference management server 10C used in the conference system 5C according to the third embodiment. As compared with the conference management server 10B shown in the second embodiment, the control unit 11 further has the function as the conference room usage management unit 24. The conference room usage management unit 24 manages the usage condition of each conference room, in which the conference indicated in the conference information is currently held or not in each conference room.

Figure 15:
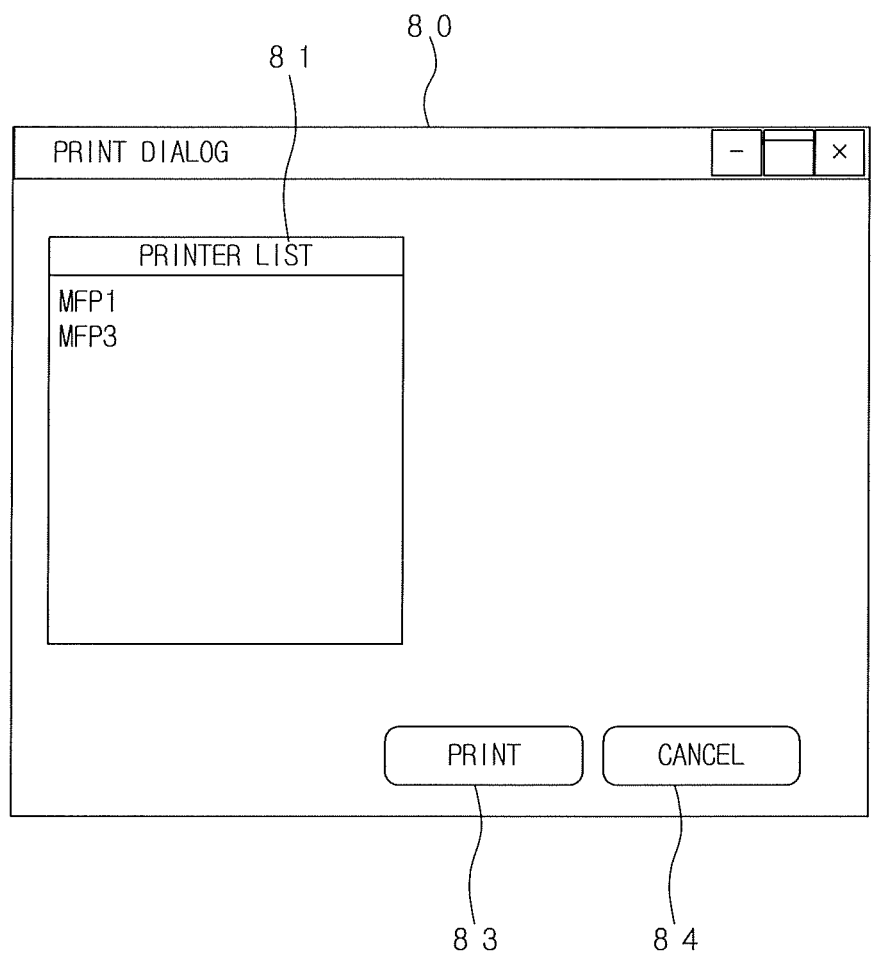
FIG. 15 is a view showing an example of the customized print instruction window which is displayed on the information processing terminal of the conference system according to the third embodiment.
Figure 16:
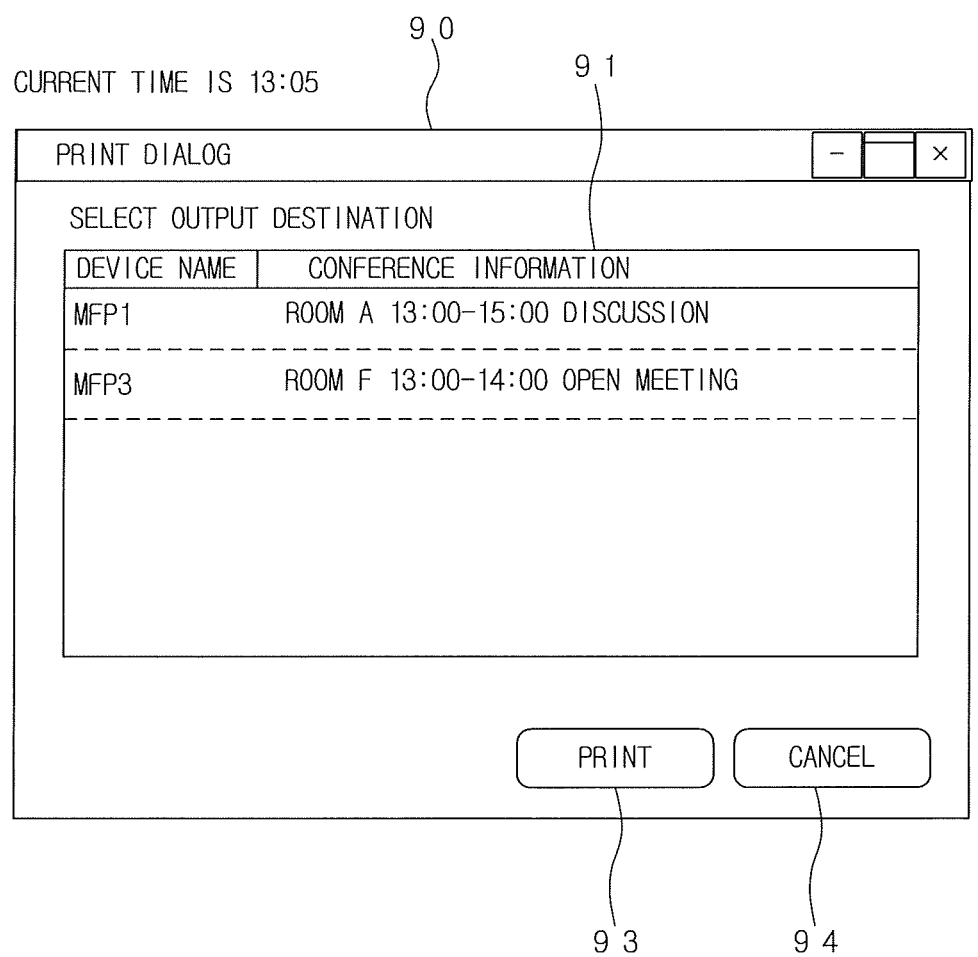
FIG. 16 is a view showing an example of another type of customized print instruction window which is displayed on the information processing terminal of the conference system according to the third embodiment.

For example, in case that MFP1, MFP2 and MFP3 are provided as the available print apparatuses 30, it is assumed that the conference is held in at least one of the conference rooms A and B which MFP1 is provided near (the conference rooms A and B which are related to MFP1 in the conference room related information registration table 70), and the conference is held in at least one of the conference rooms E to H which MFP3 is provided near. However, the conference is not held in either conference room C or D which MFP2 is provided near. In this case, as shown in FIGS. 15 and 16, MFP1 and MFP3 are displayed, but MFP2 is not displayed in each of the printer lists 81 and 91 of the customized print instruction windows 80 and 90.

By displaying the print apparatuses 30 as described above, a user can select the output destination from only the print apparatuses 30 which are provided near each place in which the conference is held. Therefore, the conference is held near the destination to which a user moves to take the printed document in case that the printing is executed. Then, the user can actually see the situation of the conference when the user takes the printed document. It is possible to motivate the user to participate in the conference in order to increase the possibility that the user participates in the conference.

In order to judge whether the conference is held or not, the following process is executed. For example, when the conference is started, the promoter of the conference accesses to the conference management server 10 by using a web interface or the like, and switches on the conference starting flag indicating the starting of the conference.

The print program of the information processing terminal 40 obtains the information indicating whether the conference is started and the conference information from the conference management server 10. Then, with respect to each print apparatus 30, the print program checks the conference starting flag of each conference room related to the print apparatus 30. When there is at least one conference room of which the conference starting flag is switched on, the print apparatus 30 is displayed in the printer list. When all of the conference starting flags of the conference rooms related to the print apparatus 30 are switched off, the print apparatus 30 is not displayed in the printer list.

Alternatively, a motion sensor is attached to each conference room. When a human is detected by the motion sensor, it is judged that the conference is currently held in the conference room. In case that a human is not detected by the motion sensor, it is judged that the conference is not held in the conference room. The output signal of the motion sensor is transmitted to the conference management server 10. Thereby, the conference room usage management unit 24 manages the usage condition of each conference room.

Figure 17:
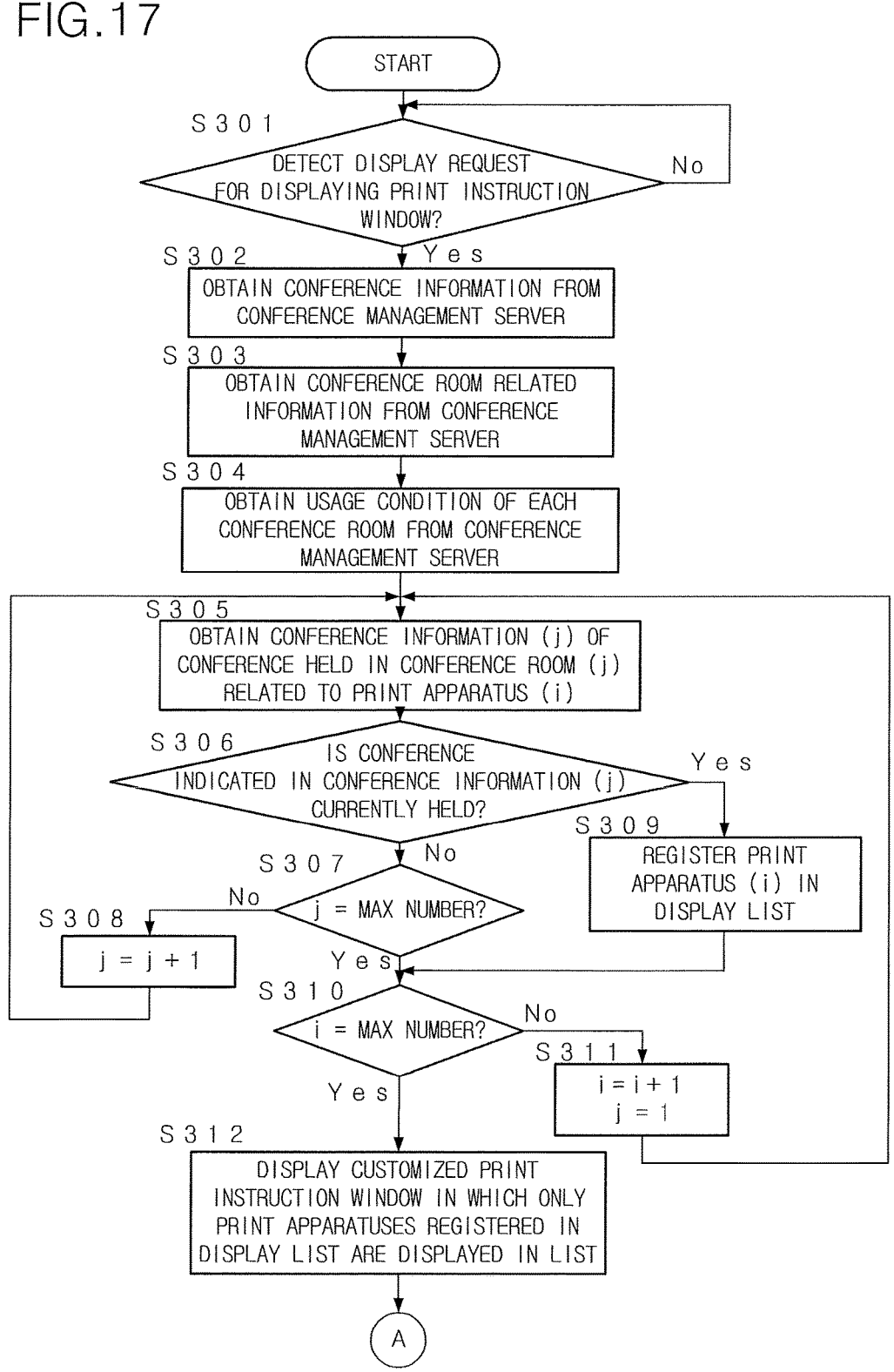
FIG. 17 is a flowchart showing the process which is executed by the print program installed in the information processing terminal of the conference system according to the third embodiment.

FIG. 17 is a flowchart showing the process which is executed by the print program installed in the information processing terminal 40 of the conference system 5C according to the third embodiment. The print program monitors whether the application program, such as the document preparation application or the like, outputs the display request for displaying the print instruction window (Step S301; No). When the print program detects the above display request (Step S301; Yes), the print program accesses to the conference management server 10 to obtain the conference information (Step S302).

Further, the print program obtains the conference room related information (the information registered in the conference room related information registration table 70) from the conference management server 10 (Step S303). Further, the print program obtains the information indicating the usage condition of each conference room from the conference management server 10 (Step S304).

The information processing terminal 40 recognizes the print apparatuses 30 on the network 3 and the conference rooms related to each print apparatus 30 from the obtained conference room related information. In case that the conference is held in at least one of the conference rooms related to one print apparatus 30 (Step S306; Yes), the above one print apparatus 30 is registered in the display list (Step S309). On the other hand, in case that the conference is not held in any of the conference rooms related to one print apparatus 30 (Step S307; Yes), the above one print apparatus 30 is not registered in the display list.

After the above-described check is finished for all of the print apparatuses (Step S310; Yes), the customized print instruction window 80 or 90 in which only the print apparatuses 30 registered in the display list are listed in the printer list 81 or 91, is displayed (Step S312). The subsequent process is the same as the process executed subsequently from Step S205 shown in FIG. 13, and the explanation thereof is omitted.

In detail, in Step S305 to Step S311 shown in FIG. 17, the following process is executed. In Step S305 to Step S311, the i-th print apparatus 30 is referred to as the print apparatus (i), the j-th conference room of the conference rooms related to the print apparatus (i) is referred to as the conference room (j) and the conference information of the conference held in the conference room (j) is referred to as the conference information (j). Each initial value of i and j is 1.

The conference information (j) of the conference held in the conference room (j) related to the print apparatus (i) is obtained (Step S305), and it is judged whether the conference indicated in the conference information (j) is currently held or not (Step S306). In case that the indicated conference is currently held (Step S306; Yes), the print apparatus (i) is registered in the display list (Step S309). Then, the process proceeds to Step S310, and the above-described check is executed for the next print apparatus.

In case that the indicated conference is not currently held (Step S306; No), it is judged whether the conference room (j) is the last conference room (j is the maximum number of conference rooms) related to the print apparatus (i) or not (Step S307). In case that the conference room (j) is not the last conference room (Step S307; No), the value j is incremented by +1 (Step S308). Then, the process returns to Step S305, and the above-described check is executed for the next conference room.

In case that the conference room (j) is the last conference room (j is the maximum number of conference rooms) related to the print apparatus (i) (Step S307; Yes), it is checked whether the print apparatus (i) is the last print apparatus (i is the maximum number of print apparatuses) or not (Step S310). In case that the print apparatus (i) is not the last print apparatus (i is the maximum number of print apparatuses) (Step S310; No), the value i is incremented by +1 and the value j is set to 1 (Step S311). Then, the process proceeds to Step S305, and the above-described check is executed for the next print apparatus. In case that the print apparatus (i) is the last print apparatus (Step S310; Yes), the customized print instruction window in which only the print apparatuses registered in the display list are listed in the printer list is displayed (Step S312).

Fourth Embodiment

In the fourth embodiment, like the third embodiment, it is confirmed whether the conference is held in each conference room. Then, only the printer apparatuses 30 which the conference is held near are shown in the printer list. However, in the fourth embodiment, whether the conference is held in the conference room is judged in accordance with the usage condition of the projector provided in the conference room. In many cases, when the conference is held, the projector is switched on.

Figure 18:
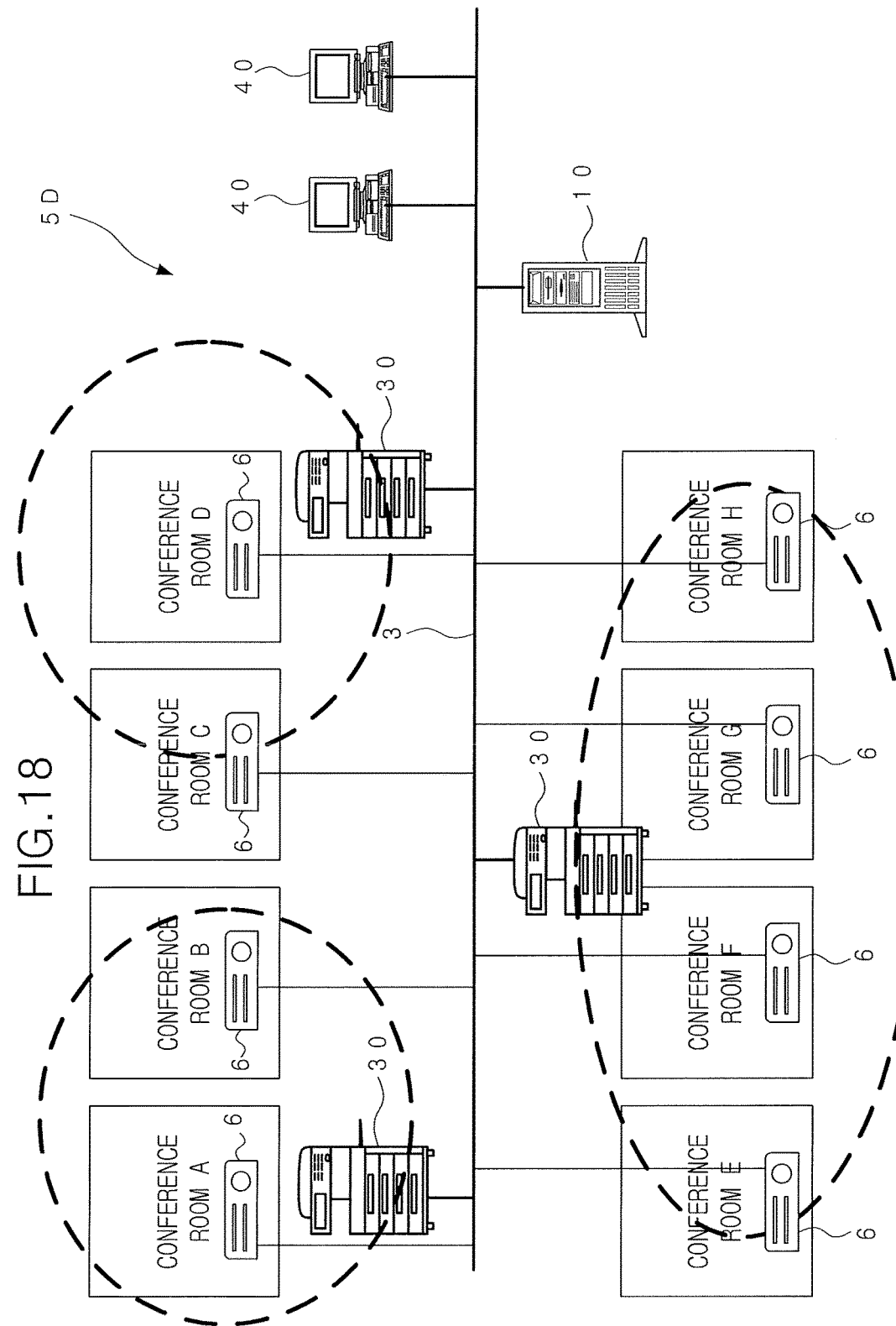
FIG. 18 is a view showing an example of the configuration of the conference system according to the fourth embodiment and an example of the operating environment thereof.

FIG. 18 is a view showing the conference system 5D according to the fourth embodiment. In each conference room A to H, a projector 6 is provided. Each projector 6 is connected with the network 3. It is possible to confirm whether the projector 6 is currently used or not via the network 3 from an external device.

In this embodiment, when the information indicating the usage condition of each conference room is requested from the information processing terminal 40, the conference management server 10D confirms whether the projector 6 provided in each conference room is switched on via the network 3. Then, in case that the projector 6 is switched on, it is judged that the corresponding conference room is currently used. In case that the projector 6 is switched off, the corresponding conference room is not currently used. The result of the above judgment for each conference room is transmitted to the information processing terminal 40 which transmits the above request.

Fifth Embodiment

In the conference system 5E (See FIG. 8) according to the fifth embodiment, in case that the conference is not held at this time, however, for example, the conference will be held after a few hours, it is possible to reserve the printing so as to execute the printing at the opening time of the conference.

A user views the conference information displayed on the customized print instruction window and wants to participate in the conference. However, in case that the above conference will be held after a few hours, even though the print is immediately executed, the user does not participate in the conference when the user takes the printed document. Therefore, it is possible to reserve the printing so as to execute the printing at the opening time of the conference which will be held after a few hours.

Figure 19:
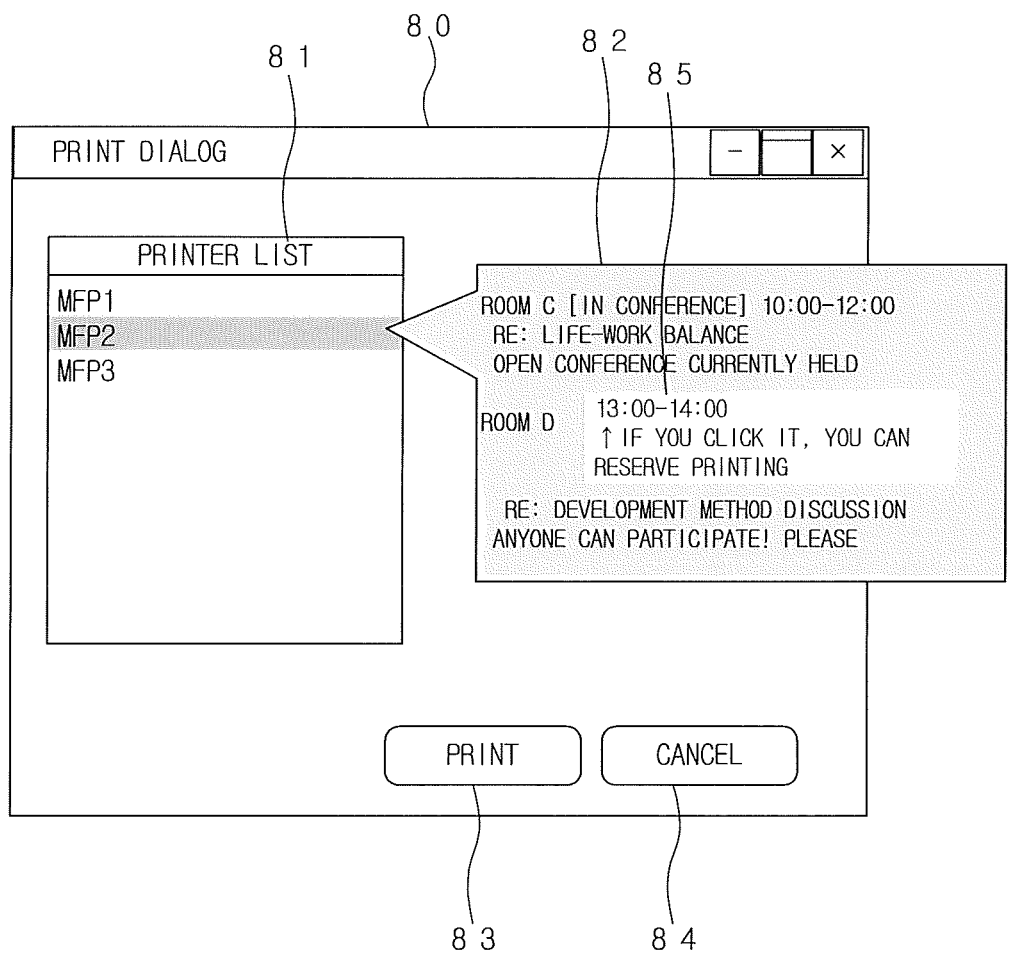
FIG. 19 is a view showing an example of the customized print instruction window which is displayed on the information processing terminal of the conference system according to the fifth embodiment and which has the print reservation function.
Figure 20:
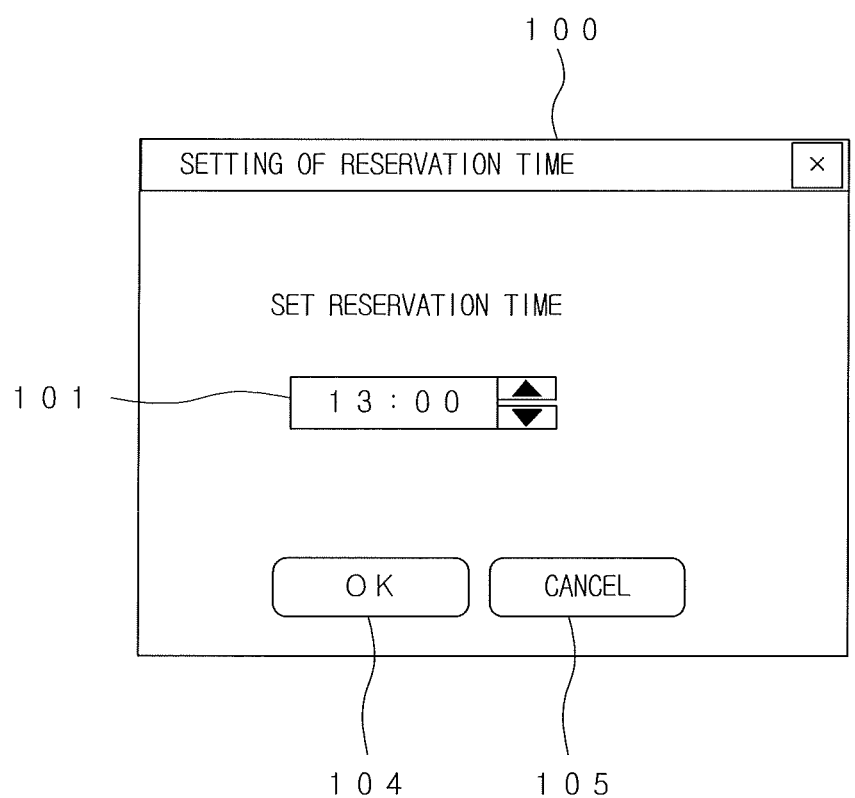
FIG. 20 is a view showing an example of the print reservation window.

FIG. 19 is a view showing an example of the customized print instruction window 80 which has the print reservation function. In this example, the current time is 10:00. Because the conference to be held in the conference room D will be held from 13:00 and a few hours later from the current time, the print reserve button 85 for this conference is displayed. In this example, the information display part for indicating the time period 13:00-14:00 has the function as the print reservation button 85, and when the information display part is clicked, the print reservation window 100 is displayed as shown in FIG. 20.

In the print reservation window 100, the reservation time setting box 101 is arranged. In this reservation time setting box 101, the opening time of the conference held in the conference room D is displayed as the default reservation time. The user can optionally change this time. When the user presses down the OK button 104, the print reservation in which the time which is currently displayed in the reservation time setting box 101 is set to the print starting time, is registered and the print reservation window 100 is closed. When the cancel button 105 is pressed down, the print reservation window 100 is closed without registering the print reservation.

In case that the print reservation is registered, the print job including the reservation time information is transmitted from the information processing terminal 40 to the conference management server 10E. The conference management server 10E temporarily holds the print job, and when the reservation time arrives, the print job is transmitted to the selected print apparatus.

Sixth Embodiment

In the conference system 5F (See FIG. 8) according to the sixth embodiment, the order of the print apparatuses 30 displayed in the printer list is changed in accordance with the conference participation history of each user and the attribute of each user (the interested field, the specialization or the like). In this embodiment, the correlation (relation) between the user who is logged in the information processing terminal 40 and the conference is calculated and the printer list is displayed so as to preferentially display the print apparatus 30 provided near the conference room in which the conference having the high correlation with the logged-in user is held. Specifically, the display order of the print apparatuses 30 is controlled so as to arrange the print apparatus 30 at the uppermost position of the printer list, which is provided near the conference room in which the conference having the higher correlation with the logged-in user is held.

Figure 21:
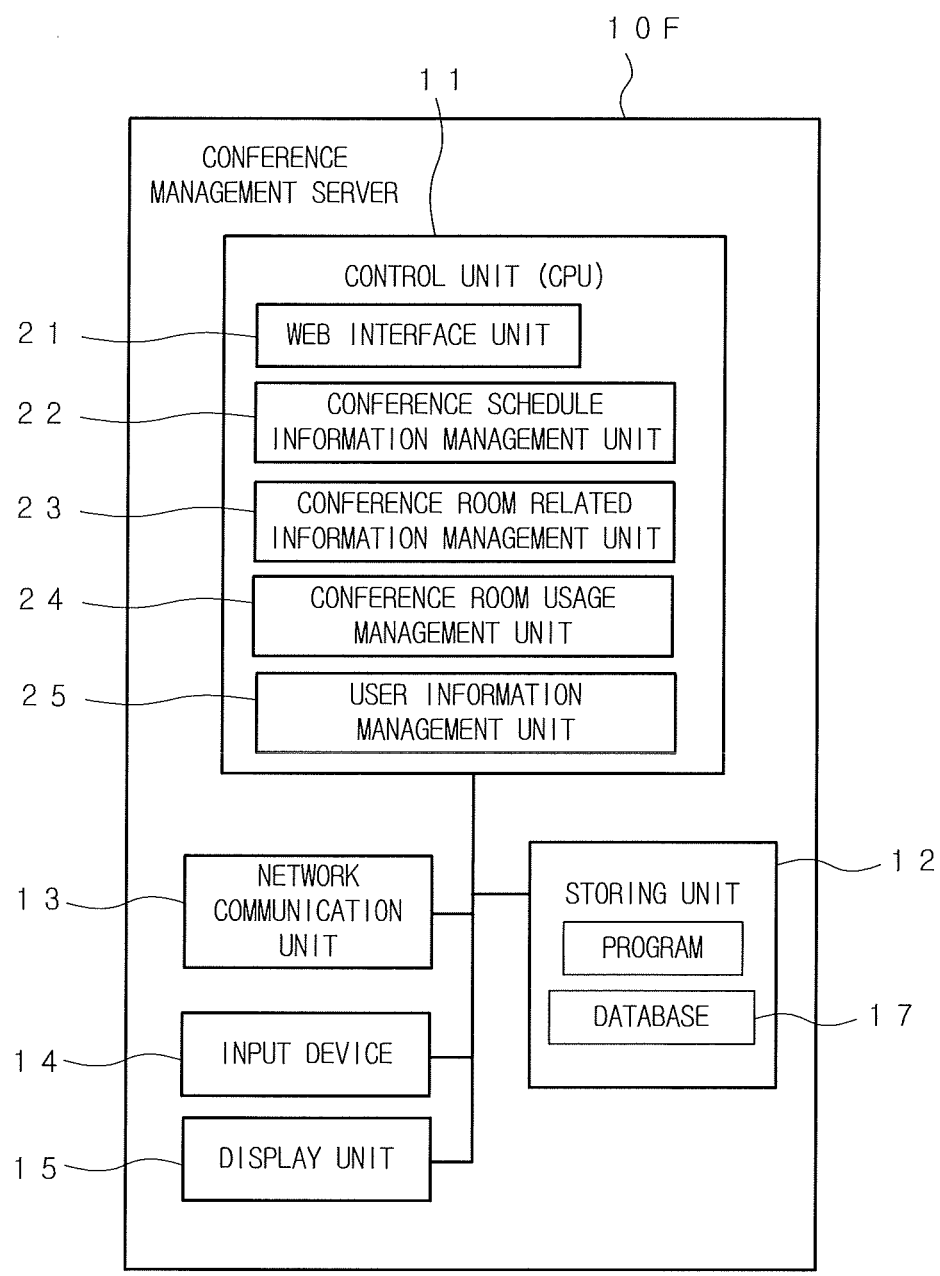
FIG. 21 is a block diagram showing the schematic configuration of the conference management server used in the conference system according to the sixth embodiment.

FIG. 21 is a block diagram showing the schematic configuration of the conference management server 10F used in the conference system 5F according to the sixth embodiment. As compared with the conference management server 10C according to the third embodiment, the control unit 11 further has the function as the user information management unit 25. The user information management unit 25 registers and manages the conference participation history and the attribute of each user.

FIG. 22 shows an example of the conference participation history registration table 110 in which the conference participation history of one user, which is managed by the user information management unit 25, is registered. In the conference participation history registration table 110, the participation time of the conference and the title and the contents of the conference are registered with respect to each conference which one user participated in. The conference participation history registration table 110 is prepared for each user.

As the registration method for registering the conference participation history in the conference participation history registration table 110, the user or the administrator accesses to the conference management server 10 via the web interface to register the conference participation history. Alternatively, in case that each user has an RFID (Radio Frequency Identification) card, the RFID card of the user is detected by a sensor provided in the conference room to automatically register the conference participation history.

FIG. 23 shows the conference information of the conferences which are currently held or will be held and which are registered in the conference management server 10F. In the registered conference information 1, the conference held in the conference room A is registered. In the registered conference information 2, the conference held in the conference room D is registered.

Figure 24:
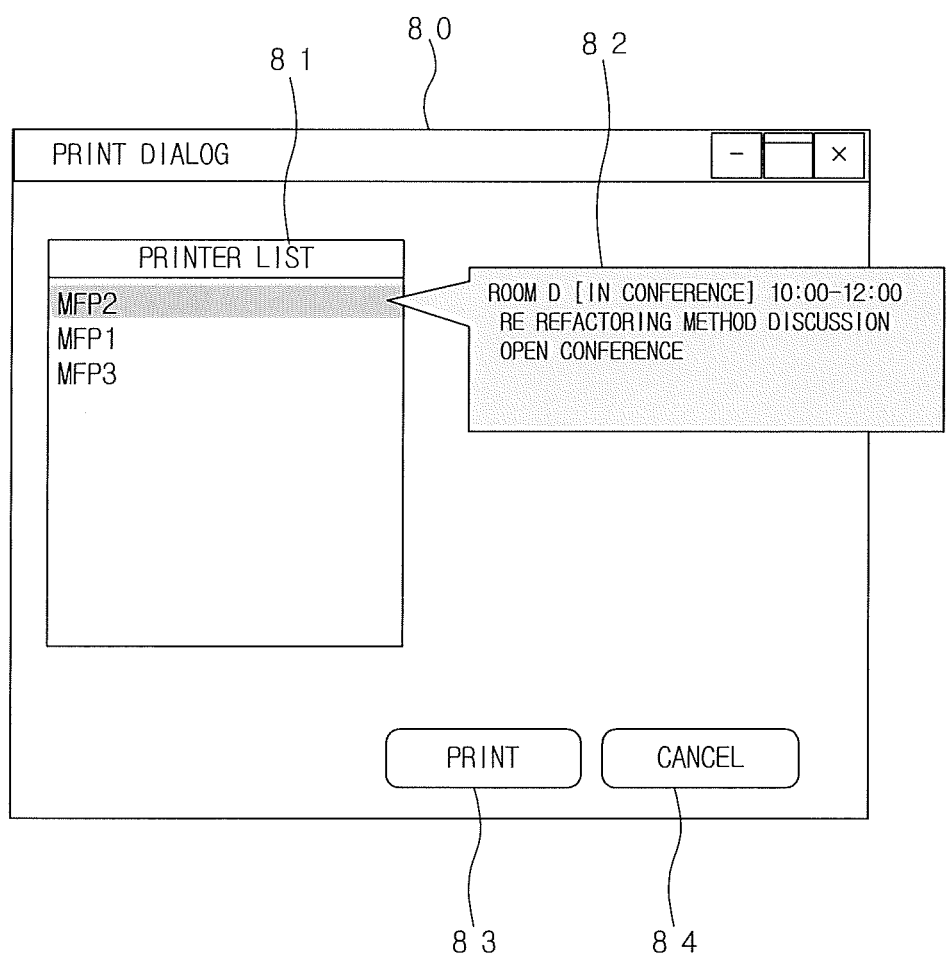
FIG. 24 is a view showing an example of the customized print instruction window which is displayed on the information processing terminal of the conference system according to the sixth embodiment.

In this example, in the conference management server 10F, the conference information shown in FIG. 23 is registered. The conference participation history of the user who is logged in the information processing terminal 40 is shown in FIG. 22. In this case, it is judged that the correlation between the conference held in the conference room D and the logged-in user is high. As shown in FIG. 24, MFP2 provided near the conference room D (related to the conference room D) is preferentially displayed in the printer list. That is, in case that the above correlation is not considered, MFP1, MFP2 and MFP3 are displayed in the print list in this order. However, in FIG. 24, by preferentially displaying MFP2 having the higher correlation, MFP2, MFP1 and MFP3 are displayed in this order.

An example of the calculation of the correlation is shown. The title registered in the conference participation history registration table 110 is compared with the title of the conference registered in the conference information, and the correlation is calculated in accordance with the similarity between the above titles.

In detail, the morphological analysis is performed for the title of the conference registered in the conference participation history registration table 110, and the list of the used words (morpheme list) is prepared. In case of the conference participation history registration table 110 shown in FIG. 22, the result of the morphological analysis is as follows.

"Development", "Discussion", "Paper", "Technology" and "Refactoring"

At this time, the word which is frequently used in the conference may be excluded. For example, the words, such as "Discussion", "Meeting" and the like may be excluded. In this case, the word "Discussion" is excluded from the morpheme list, and the words "Development", "Paper", "Technology" and "Refactoring" are registered in the morpheme list 1.

Next, the morphological analysis is performed for each title indicated in the registered conference information 1 and the registered conference information 2 shown in FIG. 23, which is the conference information registered in the conference management server 10F. The morpheme list 2 is prepared in accordance with the registered conference information 1 and the morpheme list 3 is prepared in accordance with the registered conference information 2 as follows.

In case of the registered conference information 1, the morphological analysis is performed for the title "life-work balance", and the morpheme list 2 in which the words "Life", "Work" and "Balance" are registered is prepared.

In case of the registered conference information 2, the morphological analysis is performed for the title "refactoring method discussion", and the words "Refactoring", "Method" and "Discussion" are extracted. Then, the word "Discussion" is excluded, and the morpheme list 3 in which the words "Refactoring" and "Method" are registered is prepared.

In this example, it is checked how many times the words registered in the morpheme list 2 appear in the morpheme list 1 and how many times the words registered in the morpheme list 3 appear in the morpheme list 1. The number of times the words appear is calculated as the correlation. Because the words registered in the morpheme list 2 do not appear in the morpheme list 1, the correlation between the logged-in user and the conference indicated in the registered conference information 1 is 0. On the other hand, because the word "Refactoring" registered in the morpheme list 3 appears in the morpheme list 1, the correlation between the logged-in user and the conference indicated in the registered conference information 2 is 1.

From the above result, the print apparatus 30 (MFP2) related to the conference room D in which the conference indicated in the registered conference information 2 and having the higher correlation is held is displayed prior to MFP1 and MFP3 (See FIG. 24). In case of the conference information shown in FIG. 23, because there is no conference which is held in the conference room related to MFP3, MFP1 related to the conference room in which the conference is held is displayed prior to MFP3.

The correlation is based on the conference participation history as described above. Alternatively, for example, the category of the specialization of the user and the category of the conference are registered, and the correlation may be decided by judging whether the category of the specialization is matched with the category of the conference, or may be calculated by comparing the terms relating to the specialization with the title of the conference.

Figure 25:
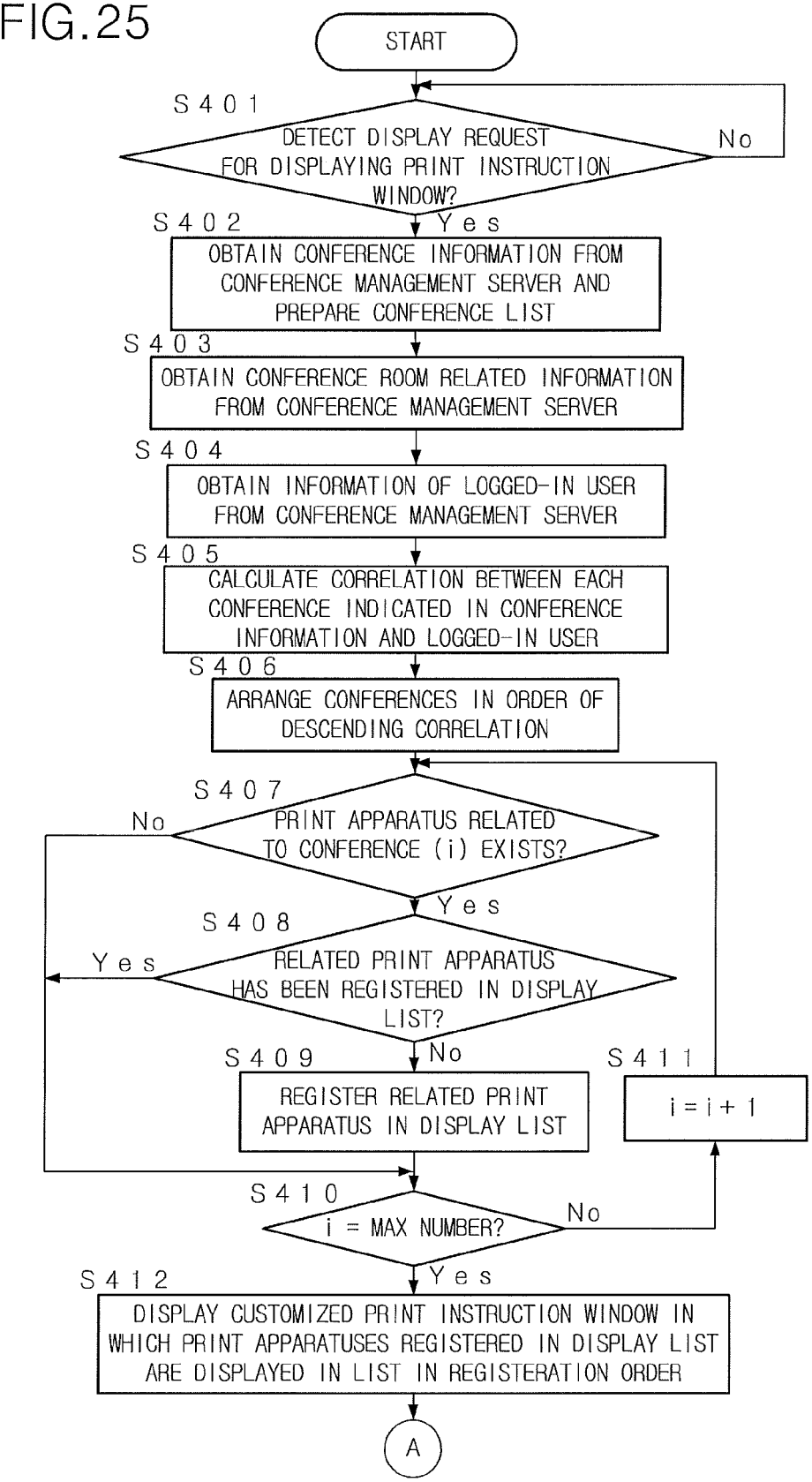
FIG. 25 is a flowchart showing the process which is executed by the print program installed in the information processing terminal of the conference system according to the sixth embodiment.

FIG. 25 is a flowchart showing the process which is executed by the print program installed in the information processing terminal 40 of the conference system 5F according to the sixth embodiment. The print program monitors whether the application program, such as the document preparation program or the like, outputs the display request for displaying the print instruction window (Step S401; No). When the print program detects the above display request (Step S401; Yes), the print program accesses to the conference management server 10F to obtain the conference information and prepares the conference list in which the conferences indicated in the conference information are registered (Step S402).

Further, the print program obtains the conference room related information (the information registered in the conference room related information registration table 70) from the conference management server 10 (Step S403). Further, the print program identifies the user who is logged in the information processing terminal 40, and obtains the information of the logged-in user, such as the above-described conference participation history registration table 110 and the like, from the conference management server 10F (Step S404).

Next, the print program calculates the correlation between each conference registered in the conference list prepared in Step S402 and the logged-in user (Step S405). Then, the conferences registered in the conference list are arranged in the order of descending correlation (Step S406).

In the order from the uppermost position of the conference list, the print program checks whether the print apparatus 30 related to the conference room in which the targeted conference is held exists or not (Step S407). As the result of the above check, in case that the related print apparatus 30 does not exist (Step S407; No), the process proceeds to Step S410. On the other hand, in case that the related print apparatus 30 exists (Step S407; Yes), the above print apparatus 30 is registered in the display list. However, in case that the above print apparatus 30 has been registered in the display list (Step S408; Yes), because the display order of the print apparatus 30 which has been registered is higher, the process proceeds to Step S410 without registering the above print apparatus 30 in the display list again.

In case that the above print apparatus 30 has not been registered in the display list (Step S408; No), the above print apparatus 30 is registered in the display list so as to add the above print apparatus 30 at the lowest position of the display list (Step S409). Then, the process proceeds to Step S410.

In Step S410, it is confirmed whether the above check has been executed for all of the conferences registered in the conference list. In case that the above check has not been executed for all of the conferences (Step S410; No), the targeted conference is set to the conference which is registered next in the display list (Step S411). The process returns to Step S407 and is continued.

In case that the above check has been executed for all of the conferences registered in the conference list (Step S410; Yes), the customized print instruction window 80 (See FIG. 24) in which the print apparatuses 30 registered in the display list are displayed in the printer list in the order of the registration (in the order from the uppermost position of the display list) is displayed (Step S412). The subsequent process is the same as the process executed subsequently from Step S205 shown in FIG. 13, and the explanation thereof is omitted.

FIG. 24 shows the case in which the number of the conferences held in the conference room related to one print apparatus 30 is one. In case that there are a plurality of conferences held in one or more conference rooms related to one print apparatus 30, the conference information of a plurality of conferences, which is shown in the conference information display window 82 may be arranged in the order of descending correlation between the conference and the logged-in user.

As described above, the print apparatus 30 related to the conference room held in the conference having the higher correlation with the logged-in user is displayed at the upper portion of the printer list. In general, the user searches the print apparatus 30 to be used as the output destination, from the uppermost position of the printer list. Therefore, there is a high possibility that the print apparatus 30 which is provided near the conference room in which the conference having the higher correlation with the logged-in user is held, is selected as the output destination. It is possible to motivate the user to go to see and participate in the conference when the user takes the printed document.

As described above, the embodiments are explained by using the drawings. However, in the present invention, the concrete configuration is not limited to the above embodiments. In the present invention, various modifications of the above embodiments or the addition of various functions or the like to the embodiments can be carried out without departing from the gist of the invention.

In at least one of the embodiments, the place of the conference is explained as the conference room. However, it is not necessary to use a closed room. For example, an opened conference space, such as a lobby, a corner of a passage or the like, is used as the place of the conference.

The customized print instruction window shown in each of the embodiments, is shown as an example. The window configuration thereof is not limited to the window shown in each of the embodiments. The customized print instruction window may be one for displaying the conference information or may be one for displaying the conference information of the conference held in the conference room which the print apparatus 30 is provided near, so as to relate it to the above print apparatus 30.

In at least one of the embodiments, the conference room related information registration table is stored and managed in the conference management server 10. The conference room related information registration table may be managed in another device. Further, the conference participation history, the specialization of each user and the like may be managed in another device except the conference management server 10.

One of the objects of the above embodiments is to provide a non-transitory computer-readable recording medium and a conference system which can motivate a person who does not positively participate in the conference to participate in the conference.

In at least one of the embodiments or the like, in the print instruction window having the function for receiving the selection of the print apparatus used for the printing in the list of one or more print apparatuses by displaying the list and having the function for receiving the instruction for starting the printing, the conference information is also displayed.

In at least one of the embodiments or the like, when the print instruction is received from the document preparation application, the print program is operated and displays the print instruction window including the conference information.

In at least one of the embodiments or the like, the print apparatus and the conference information of the conference held in the conference room related to the print apparatus (for example, the conference room which the print apparatus is provided near) are displayed in the print instruction window so as to relate the print apparatus to the conference information.

In at least one of the embodiments or the like, when the print apparatus is selected in the list, the conference information of the conference which is held in the conference room related to the selected print apparatus is displayed so as to relate the above conference information to the selected print apparatus.

In at least one of the embodiments or the like, only the print apparatus related to the conference room in which the conference is currently held is displayed in the list.

In at least one of the embodiments or the like, when the project provided in the conference room is used, it is judged that the conference room is currently used.

In at least one of the embodiments or the like, the attribute of the user, such as the information relating to the conference participation history, the interested field, the specialization or the like, is obtained. The correlation between the user and each conference is judged. Then, the print apparatus related to the conference room in which the conference having the higher correlation is held is preferentially displayed in the list.

In at least one of the embodiments or the like, in case that the conference will be started after a few hours, it is possible to reserve the starting of the printing at the time corresponding to the opening time of the conference.

According to the non-transitory computer-readable recording medium and the conference system, it is possible to motivate a person who does not positively participate in the conference to participate in the conference when the person takes the printed document.

The present U.S. patent application claims the priority of Japanese Patent Application No. 2016-091664, filed on Apr. 28, 2016, according to the Paris Convention, and the entirety of which is incorporated herein by reference for correction of incorrect translation.

What is claimed is:

1. A non-transitory computer-readable recording medium in which a program is stored, wherein the program is configured to provide information to a potential conference participant in at least one of a plurality of conferences by identifying potential conference participants and causing an information processing device to:
obtain conference information of the plurality of conferences; and
in response to a user request, prepare and display on a display on the information processing device a print instruction window having:
a list of available print apparatuses;
the obtained conference information for the plurality of conferences;
a function for receiving a selection of one of the print apparatuses by the user; and
a function for receiving an instruction for starting the printing of an opened document related to the at least one conference.

2. The non-transitory computer-readable recording medium of claim 1, wherein when an application program receives a print instruction for printing an opened document from a user, the print instruction window is prepared and displayed.

3. The non-transitory computer-readable recording medium of claim 1, wherein the program causes the information processing device further to obtain conference room related information for relating each print apparatus to one or more conference rooms, wherein the obtained conference information is displayed in the print instruction window so as to relate the obtained conference information to the print apparatus related to the conference room in which the conference indicated in the obtained conference information is held, in accordance with the obtained conference room related information.

4. The non-transitory computer-readable recording medium of claim 3, wherein when the selection of the print apparatus in the list is received from a user, the conference information of the conference which is held in the conference room related to the selected print apparatus is displayed so as to be related to the selected print apparatus.

5. The non-transitory computer-readable recording medium of claim 3, wherein when the print instruction window is prepared and displayed, the conference room in which the conference is currently held is specified and only the print apparatus related to the specified conference room is displayed in the list.

6. The non-transitory computer-readable recording medium of claim 5, wherein the conference room in which the conference is currently held is specified in accordance with a usage condition of a projector provided in the conference room.

7. The non-transitory computer-readable recording medium of claim 3, wherein the program causes the information processing device further to identify a user of the information processing device and to obtain an attribute of the user,
wherein a correlation between the conference indicated in the conference information and the user of the information processing device is judged in accordance with contents of the conference indicated in the conference information and the obtained attribute of the user, and the print apparatus related to the conference room in which the conference having a high correlation with the user of the information processing device is held is preferentially displayed in the list.

8. The non-transitory computer-readable recording medium of claim 1, wherein in the print instruction window, a print reservation button for reserving an execution of the printing so as to start the printing at a time corresponding to an opening time of the conference indicated in the conference information, is displayed with the conference information.

9. A print system configured to provide information to a potential conference participant in at least one of a plurality of conferences by identifying potential conference participants, the system comprising:
a plurality of print apparatuses;
a conference management server; and
an information processing terminal that transmits a print job to one of the print apparatuses, wherein the print job is related to the at least one conference,
wherein the plurality of print apparatuses, the conference management server and the information processing terminal are connected via a network, and
the information processing terminal is configured to:
obtain conference information from the conference management server of the plurality of conferences;
display a print instruction window having a function for receiving a selection of a print apparatus used for a printing in a list of the plurality of print apparatuses by displaying the list and having a function for receiving an instruction for starting the printing, on a display unit of the information processing terminal, the print instruction window indicating the conference information obtained from the conference management server; and instruct the print apparatus selected via the print instruction window to execute the printing by transmitting the print job.

10. The conference system of claim 9, wherein when the information processing terminal receives a print instruction for printing an opened document, the information processing terminal prepares the print instruction window and displays the print instruction window on the display unit.

11. The conference system of claim 9, wherein the conference management server stores conference room related information for relating each print apparatus to one or more conference rooms, and the information processing terminal obtains the conference room related information from the conference management server, and displays the conference information obtained from the conference management server in the print instruction window so as to relate the conference information to the print apparatus related to the conference room in which the conference indicated in the conference information is held, in accordance with the obtained conference room related information.

12. The conference system of claim 11, wherein when the information processing terminal receives the selection of the print apparatus in the list from a user, the conference information of the conference held in the conference room related to the selected print apparatus is displayed so as to be related to the selected print apparatus.

13. The conference system of claim 11, wherein the conference management server manages whether the conference is currently held in each conference room, and the information processing terminal obtains information indicating a situation of the conference from the conference management server, and displays only the print apparatus related to the conference room in which the conference is currently held, in the list.

14. The conference system of claim 13, wherein the conference management server judges whether the conference is currently held in each conference room in accordance with a usage condition of a projector provided in the conference room.

15. The conference system of claim 11, wherein the information processing terminal identifies a user of the information processing terminal; obtains an attribute of the user; judges a correlation between the conference indicated in the conference information and the user of the information processing terminal in accordance with contents of the conference indicated in the conference information obtained from the conference management server and the obtained attribute of the user; and preferentially displays the print apparatus related to the conference room in which the conference having a high correlation with the user of the information processing terminal is held, in the list.

16. The conference system of claim 9, wherein the information processing terminal displays a print reservation button for reserving an execution of the printing so as to start the printing at a time corresponding to an opening time of the conference indicated in the conference information, with the conference information in the print instruction window.

* * * * *